United States Patent [19]
Futamoto et al.

[11] Patent Number: 5,685,958
[45] Date of Patent: Nov. 11, 1997

[54] METHOD OF FABRICATING A MAGNETIC RECORDING MEDIUM

[75] Inventors: Masaaki Futamoto, Kanagawa-ken; Atsushi Nakamura, Hachioji; Nobuyuki Inaba, Hasuda; Yoshiyuki Hirayama, Kodaira; Yoshibumi Matsuda, Odawara; Mikio Suzuki, Kokubunji; Yukio Honda, Fuchu, all of Japan

[73] Assignee: Hitachi, Ltd., Tokyo, Japan

[21] Appl. No.: 729,381

[22] Filed: Oct. 17, 1996

Related U.S. Application Data

[60] Continuation of Ser. No. 632,255, Apr. 10, 1996, Pat. No. 5,599,580, which is a division of Ser. No. 207,609, Mar. 9, 1994, Pat. No. 5,536,585.

[30] Foreign Application Priority Data

| Mar. 10, 1993 | [JP] | Japan | 5-048847 |
| Jun. 28, 1993 | [JP] | Japan | 5-157532 |
| Jun. 28, 1993 | [JP] | Japan | 5-157533 |

[51] Int. Cl.$^6$ .................................. C23C 14/00
[52] U.S. Cl. ............... 204/192.2; 427/129; 427/130; 427/131; 427/132; 427/264; 427/270; 427/271; 427/367
[58] Field of Search ..................... 427/131, 264, 427/130, 270, 129, 271, 132, 367; 204/192.2

Primary Examiner—Bernard Pianalto
Attorney, Agent, or Firm—Antonelli, Terry, Stout & Kraus, LLP

[57] ABSTRACT

A magnetic recording medium is constructed with a substrate made of glass, one or two underlayers, and a magnetic film. In order that the easy magnetization axis of the magnetic film is parallel to the magnetic film, an underlayer having an NaCl crystallographic structure is superposed on the substrate. A magnetic film made of a Co based alloy having a hexagonal close packed crystallographic structure is formed on this underlayer, putting an underlayer made of a material having a body centered cubic crystallographic structure therebetween at need. Magnetic anisotropy of the magnetic film is increased by forming grooves in a predetermined direction in a surface portion of the substrate. These grooves play a role also for defining the orientation of the underlayer made of the material having an NaCl crystallographic structure.

6 Claims, 10 Drawing Sheets

C-AXIS ({0001} ORIENTATION)

{11$\bar{2}$0} PLANE

{1$\bar{1}$00} PLANE

O b.c.c. ATOMS IN UNDERLAYER

⊙ NaCl ATOMS IN NaCl TYPE UNDERLAYER
● NaCl ATOMS IN NaCl TYPE UNDERLAYER

METHOD OF FABRICATING A MAGNETIC RECORDING MEDIUM

This is a continuation of application Ser. No. 08/632,355, filed Apr. 10, 1996, (U.S. Pat. No. 5,599,580) which is a divisional of application Ser. No. 08/207,609, filed Mar. 9, 1994 (now U.S. Pat. No. 5,536,585).

BACKGROUND OF THE INVENTION

The present invention relates to a magnetic recording medium and a fabrication method therefor. More in detail it relates to an improvement of an inplane magnetic recording medium suitable for high-density magnetic recording.

As a magnetic recording medium there is known a magnetic recording medium, in which a magnetic film is superposed on a non-magnetic substrate through an underlayer. A Co alloy is used for the magnetic film. The crystallographic structure of this Co alloy is a hexagonal close packed structure (hereinbelow abbreviated to h.c.p.) similarly to Co of simple substance, which has an easy magnetization axis in the direction of c-axis, i.e. [0001] axis. Consequently, in case where the Co alloy described above is used for the magnetic film for a high-density magnetic recording medium, it is necessary to direct the easy magnetization axis, i.e. c-axis, substantially in the plane of the magnetic film. That is, it is necessary that the easy magnetization axis is parallel to the direction, in which the magnetic film extends.

In order that the easy magnetization axis is oriented parallelly to the magnetic film, there is known a method, by which an underlayer having a body centered cubic structure (hereinbelow abbreviated to b.c.c.) is disposed below the magnetic film. When this underlayer has a <100> orientation, the orientation of the magnetic film dispose thereon is <11$\bar{2}$0> and in this way the easy magnetization axis is oriented parallelly to the magnetic film. Concretely speaking, a construction of a high-density magnetic recording medium usable in practice at present is formed by superposing a Cr based metal layer on an Al substrate, whose surface is covered by an NiP layer, by a well-known method as an underlayer and then by superposing a Co based magnetic film further thereon by a well-known method. In such a construction, since the underlayer has a substantially <100> orientation, the Co based magnetic film disposed thereon has a <11$\bar{2}$0> orientation and thus the easy magnetization axis is parallel to the surface of the magnetic film.

U.S. Pat. No. 4,654,276, U.S. Pat. No. 4,652,499, U.S. Pat. No. 4,789,598 and U.S. Pat. No. 5,063,120 can be cited as literatures showing magnetic recording media having such a construction and these literatures are incorporated herein by reference.

However, since the Al substrate is soft, it may be deformed, when a strong impact is applied thereto from the exterior. Further, although it is required to smoothen further the surface of the substrate with recent increasing magnetic recording density and decreasing size of apparatus, softness of the substrate imposes a restriction thereon, when the surface thereof is polished so as to be smooth.

Therefore it is conceived to form the substrate by using a hard and non-magnetic material such as glass and a magnetic recording medium provided with a glass substrate is disclosed e.g. in literatures described below:

Literature: J. Appl. Phys. 67(9), 1 May (1990), pp. 4913–4915 and

Literature: JP-A-Sho 63-106917. This publication discloses a medium so constructed that an underlayer made of Cr, Mo, Ti or Ta having a predetermined thickness is disposed on a glass substrate and a magnetic film made of Co, Ni, Cr and Pt, in which the content of Pt is 1 to 43 atom %, is formed further thereon.

However, as far as the inventors know, such a magnetic recording medium provided with a glass substrate is inferior in magnetic characteristics to that having an Al/NiP substrate described previously and therefore it was not practical as a high-density magnetic recording medium.

SUMMARY OF THE INVENTION

The present invention has been done in view of the above description and one of the objects of the present invention is to provide a magnetic recording medium provided with a substrate made of a hard and non-magnetic material, which has excellent magnetic characteristics and is suitable for high-density magnetic recording, and a fabrication method therefor.

Another object of the present invention is to provide a magnetic recording medium having excellent magnetic characteristics, independently from the material of the substrate, and a fabrication method therefor.

According to an aspect of the present invention, the magnetic recording medium comprises a non-magnetic substrate, two underlayers disposed thereon directly or through some underlayer and a magnetic film disposed on these two underlayers and it is so constructed that the magnetic film has a hexagonal close packed structure, that the first underlayer, which is directly below the magnetic film, between the two underlayers has a body centered cubic structure, and that the second underlayer disposed directly below the first underlayer has an NaCl type crystallographic structure.

FIG. 1 shows schematically an example of the magnetic recording medium, which will be explained below. A magnetic film 12 having an h.c.p. structure is formed on the first underlayer 13 having a b.c.c. structure. This first underlayer 13 is formed on the second underlayer 14 having an NaCl type crystallographic structure. The second underlayer is formed on a non-magnetic substrate 15 directly or through some underlayer. It is preferable that a protecting film 11 is formed on the magnetic film 12.

It is preferable that the dominant orientation of the magnetic film is <11$\bar{2}$0> and that the dominant orientations of both the first and the second underlayer are <100>. Further both the first and the second underlayer are preferably made of non-magnetic materials.

Furthermore the magnetic film is preferably made of Co or an alloy, whose main component is Co. Heretofore various sorts of alloys, whose main component is Co, have been used as magnetic films and such alloys can be used for realizing the present invention.

Concretely speaking, Co based alloys containing at least one element among Cr, Ni, Fe, V, Ti, Zr, Hf, Mo, W, Ta, Re, Ru, Rh, Ir, Pt, Pd, Au, Ag, Cu, B, Al, C, Si, P and N are usable therefor. They are e.g. binary alloys such as Co—Cr, Co—Ni, Co—Fe, Co—V, Co—Mo, Co—Ta, Co—Re, Co—Pt, Co—Pd, etc. or ternary alloys, in which a third element is added to these binary alloys, such as Co—Cr—Ta, Co—Cr—Pt, Co—Cr—Mo; Co—Cr—W, Co—Cr—Re, Co—Ni—Zr, Co—Pt—Ta, Co—Pt—B, etc. or quarternary alloys, in which a fourth element is added thereto, such as Co—Cr—Ta—B, Co—Cr—Ta—Si, Co—Cr—Ta—C, Co'Cr—Ta—P, Co—Cr—Ta—N, Co—Cr—Pt—B, etc. Since in these alloys the content of Co is greatest and in addition the crystallographic structure thereof is h.c.p., they can be a Co based alloy magnetic film, which can be an object of the present invention. Further for the magnetic film not only a single layer but also a multilayered film or a film having a compositional gradient in the film thickness direction can be used. The film thickness may be comprised between 2 nm and 100 nm, preferably between 5 nm and 50 nm.

For forming the magnetic layer either one of radio frequency sputtering method, radio frequency magnetron sputtering method, DC sputtering method, DC magnetron sputtering method, ion beam sputtering method, ion beam plating method and physical vapor deposition method such as vacuum vapor deposition method may be used.

At least one sort of material selected from the group consisting of Cr, Mo, W, V, Nb, Ta and alloys, whose main component is these elements, is preferably used as material for the first underlayer. It is a matter of course that the material for the first underlayer is not necessarily restricted to these materials, but other metals or alloys having the b.c.c. structure can be used therefor. It is preferable that the thickness of the first layer is comprised between 2 nm and 1 μm. From the economical point of view it is desirable that it is comprised between 2 and 200 nm. The first underlayer can be formed also by the physical vapor deposition method similarly to the magnetic film.

Either one of MgO, CaO, TiO, VO, MnO, CoO, NiO and a mixed crystal, whose main component is these compounds, or either one of LiCl, NaCl, KCl and a mixed crystal, whose main component is these compounds, or either one of TiC, ZrC, HfC, NbC, TaC and a mixed crystal, whose main component is these compounds, may be suitably used as a material for the second underlayer. It is preferable that the thickness thereof is comprised between 10 nm and 100 μm. When it is smaller than 10 nm, it is difficult to intercept influences given by the base substrate on growth of the film having the b.c.c. structure, while when it is greater than 100 μm, time necessary for the formation of the film is too long and further undesirable phenomena such as enlargement of crystal grains in the oriented film, etc. take place. This second underlayer is formed also by the physical vapor deposition method such as the radio frequency magnetron sputtering method, etc.

The substrate is made of a non-magnetic material and has a smooth surface. In view of increasing requirement of the impact resistant property and the smoothness of the surface, it is preferable that the substrate is made or glass such as soda lime glass, alumino-silicate glass, quartz glass, etc. or carbon. A substrate made of such a hard material, i.e. glass, is used in the present embodiment. It is a matter of course that the present invention doesn't exclude to use Al or Si for the material, of which the substrate is to be made. The shape of the substrate is not necessarily circular, but rectangular substrates will be used in some embodiments. The texture at the surface of the substrate will be explained later.

When the magnetic film is made of Co or an alloy, whose main component is co, the first underlayer is preferably made of Cr or an alloy, whose main component is Cr. Further, when the first underlayer is made of Cr or an alloy, whose main component is Cr, the second underlayer is preferably made of MgO, LiF or a mixed crystal, whose main component is these inorganic compounds.

In the case where the c-axis of the magnetic film having the h.c.p. structure is to be oriented in the plane of the film, it can be thought that a low index crystallographic plane, which is to be parallel to the surface of the film, is a $\{11\bar{2}0\}$ or $\{1\bar{1}00\}$ plane. It is known that it is efficient to use an underlayer having a <100> oriented textured b.c.c. structure in order that the $\{11\bar{2}0\}$ plane between them is parallel to the surface of the film. FIG. 3 shows a matching relation between the $\{11\bar{2}0\}$ plane of the h.c.p. structure and the $\{100\}$ plane of the b.c.c. structure. One of the alloys described previously is used for the non-magnetic underlayer having the b.c.c. structure and it is desirable to select one of them so that the interatomic distance in the $\{100\}$ plane thereof is matched with the interatomic distance in the $\{11\bar{2}0\}$ plane of the material, of which the magnetic film stated above is made. Concretely speaking, as understood from FIG. 3, they are so selected that Formula 1 and Formula 2 described below have values as close as possible.

$$a(bcc) \times 2 \quad (1)$$

$$\sqrt{(c(hcp))^2 + a(hcp)^2 \times 3} \quad (2)$$

where a(bcc) is a lattice constant for a-axis in the b.c.c. structure, c(hcp) is a lattice constant for c-axis in the h.c.p. structure, and a(hcp) is a lattice constant for a-axis in the h.c.p. structure. It is preferable that the difference between Formula 1 and Formula 2 is smaller than ±10% and it is more preferable that the difference is smaller than ±4%.

However a b.c.c. crystal has generally a property that it is apt to be <110> oriented textured. For this reason it is not easy to have a dominant orientation of <100> while forming it directly on the substrate.

Therefore, according to the present invention, orientation of the b.c.c. underlayer (first underlayer) is controlled by disposing the second underlayer having the NaCl type crystallographic structure directly below it. As indicated in FIG. 4, this utilizes the fact that the $\{100\}$ plane of the b.c.c. structure is easily epitaxially grown on the $\{100\}$ plane of the NaCl type crystallographic structure. Further an NaCl type crystal has a property that it is generally easily <100> oriented textured. Consequently it is possible to obtain a film of sufficiently <100> oriented textured b.c.c. crystals by making b.c.c. crystals epitaxially grow on the surface thereof.

The materials described previously are used for the non-magnetic underlayer having the NaCl type structure and particularly it is desirable to select them so that the interatomic distance in the $\{100\}$ plane thereof is matched with the interatomic distance in the $\{100\}$ plane of the first underlayer. Concretely speaking, as understood from FIG. 4, they are so selected that Formula 3 and Formula 4 described below have values as close as possible.

$$a(bcc) \times \sqrt{2} \quad (3)$$

$$a(NaCl) \quad (4)$$

where a(bcc) has a meaning already explained and a(NaCl) is a lattice constant for a-axis in the NaCl type structure. It is preferable that the difference between Formula 3 and Formula 4 is smaller than ±20% and it is more preferable that the difference is smaller than ±5%.

When the h.c.p. magnetic film is made epitaxially grow on the first b.c.c. underlayer, which is satisfactorily <100> oriented textured, a magnetic film, which is <11$\bar{2}$0> oriented textured and in which the easy magnetization axis of individual crystal grain is oriented in the plane of the film, is obtained. A magnetic film thus obtained exhibits a coercive force and a squareness ratio in in-plane direction, which are higher than those obtained in the where only the b.c.c. underlayer is formed on the substrate and the h.c.p. magnetic film is formed further thereon, and it can be used as an in-plane magnetic recording medium, by means of which data can be recorded and reproduced with a higher density.

According to a second aspect of the present invention, not only easy magnetization axes of individual grains in the Co based alloy constituting the magnetic film can be made parallel to the film, but also they can be aligned. Preferably the easy magnetization axes are aligned in the recording direction. The magnetic recording medium according to the present aspect is also composed of a magnetic film, a first and a second underlayers, and a substrate, and materials and a method for forming them as well as the thickness thereof can be identical to those explained for the first aspect. Hereinbelow the present aspect will be explained more in detail.

When a <100> single crystal film having an NaCl type crystallographic structure or a <100> oriented textured film, whose [001] orientation is controlled so as to be in a predetermined direction with respect to a substrate, is used as a substrate or an underlayer and an underlayer having a body centered cubic (bcc) structure is formed thereon, a single crystal layer or an oriented film, whose {100} plane is parallel to the substrate, is obtained. When a Co based alloy magnetic film having a hexagonal close packed (hcp) structure is formed on this film, a single crystal or an oriented magnetic film, whose {11$\bar{2}$0} plane is parallel to the substrate, is obtained. In this case, the [0001] axis, which is the easy magnetization axis of the magnetic film, is parallel to the substrate and when it is formed on the bcc <100> oriented film, the [0001] axis is controlled so as to be in a predetermined direction with respect to the substrate.

Further, also when the Co based alloy magnetic film having the hcp structure is formed directly on a <100> single crystal having the NaCl type crystallographic structure or a <100> oriented film, the [0001] axis, which is the easy magnetization axis of the magnetic film, is parallel to the substrate. In the case where a film having the bcc structure is used, since it is possible to regulate the diameter of crystal grains and the distance between crystal grains in a state where the <100> orientation is maintained by controlling film forming conditions, the constructions described above have a feature that micro structure of the magnetic recording medium can be controlled and therefore they may be utilized, depending on the purpose of utilization.

As a method for forming a <100> oriented textured film made of a material having the NaCl structure on a substrate serving as a base, it is possible e.g. to form microscopic unevenness called grating or texture on the substrate and to make the <100> oriented textured film grow thereon, using grapho-epitaxial crystal growth. The grapho-epitaxial crystal growth is described e.g. in "KOTAI BUTSURI (Solid Physics)" Vol. 20, No. 10 (1985), pp. 815~820. If the grating or the texture is formed in concentric circles or in a spiral shape in a circumferential direction on a disk-shaped substrate, the [010] or [001] direction of the crystal having the NaCl structure is distributed also in concentric circles and as the result it is possible to align the easy magnetization axis of the Co based magnetic film.

The easy magnetization axis [0001] of the Co based magnetic film having the hcp structure is parallel to a [011] or [01$\bar{1}$] direction of the bcc <100> oriented film. Since Co based alloy crystals having the hcp crystallographic structure, whose easy magnetization axes are perpendicular to each other, are grown mixedly on one <100> oriented crystal made of a material having the bcc structure, two sorts of easy magnetization axes in the circumferential and the radial direction exist mixedly. If microscopic unevenness is formed so that two sorts of patterns depict arcs in directions opposite to each other along the radial direction of the disk-shaped base substrate and that they intersect each other in crosshatch, it is possible to align approximately the <011> direction of the material crystal having the NaCl type crystallographic structure in the circumferential direction of the disk-shaped substrate. In this way it is possible to align the easy magnetization axes of the Co based alloy crystal having the hcp structure in two directions deviated by 45° from the circumferential direction towards the inner and the outer periphery.

By using this method, it is possible to control the easy magnetization axis of the magnetic film so as to be parallel to the surface of the substrate and further to align the easy magnetization axis in a predetermined direction with respect to the circumferential direction for a disk-shaped substrate. In this way it can be aligned in the same direction as the recording direction at magnetic recording and as the result, characteristics of the in-plane magnetic recording medium can be improved. Since distribution of crystal grains in the magnetic film can be also controlled, it is possible to provide a magnetic medium suitable for a high-density magnetic recording.

Furthermore, in the where the magnetic recording medium is used, combined with a magnetic head, taking it into account to realize a high track density, grooves or recesses may be disposed or non-magnetic regions or regions having different optical reflectivities may be formed on the magnetic recording medium fabricated by the method described above.

FIG. 5 is a cross-sectional schematical diagram of a part of a disk-shaped magnetic disk according to a mode of realization of the present invention. The present invention will be explained below, referring to this figure. Unevenness consisting of recess portions 22 and protruding portions 23 as indicated in this cross-sectional diagram is formed in a surface portion of a disk-shaped non-magnetic substrate 21. It is preferable that they are so formed that the recess portions are larger than the protruding portions. When a material having the NaCl type structure is grown grapho-epitaxially thereon,.an oriented film 24, whose surface has a {100} plane, is obtained on the recess portions. On the protruding portions, although the probability, with which crystals having the {100} plane are grown, is also high, crystals having other orientations can grow also thereon.

It is useful that the orientation of the grating or the texture is aligned in the circumferential or radial direction of the disk. In this case, it is not always necessary that the grating or the texture is continuous over the whole periphery, but it may be interrupted. Any material having an NaCl type crystallographic structure has a tendency that a {100} plane develops. In a groove having a flat bottom as indicated in FIG. 5, the {100} plane is parallel to the bottom and in addition, since faces adjacent to walls of the protruding portions in the unevenness are also apt to be {100} planes, the <100> orientation of the NaCl type crystals is also defined with respect to the substrate.

As indicated in FIG. 6A, if the grating has a concentric circular form, a spiral form or a similar form, <100> orientations of the crystals having the NaCl type crystallographic structure are distributed in concentric circles. On the other hand, as indicated in FIG. 6B, if 2 sorts of patterns are formed so that they depict arcs in directions opposite to each other along the radial direction of the disk-shaped base substrate and that they intersect each other in crosshatch, <110> orientations of the crystals having the NaCl type crystallographic structure can be distributed approximately in concentric circles.

When a film having the bcc structure is formed on a film having such a structure, an oriented film 25, whose {100} plane is parallel to the base substrate, is grown owing to an epitaxial phenomenon. Then, when a Co based alloy magnetic film having the hcp structure is formed thereon, an oriented film 26, whose {11$\bar{2}$0} plane is parallel to the base substrate, is grown owing to the epitaxial phenomenon. Thus the easy magnetization axis [0001] of the magnetic film is parallel to the substrate, parallel to the <110> orientation of the bcc textured crystal, and parallel to the <100> orientation of the oriented crystals having the NaCl type crystallographic structure.

That is, it is possible to control the direction of the easy magnetization axis of the magnetic film, depending on the direction of stripes of the grating or the texture and in particular the direction of perpendicular flanks of the protruding portions and directions of stripes of the grating or the texture indicated in FIGS. 6A and 6B give easy magnetization axis distributions desirable for the magnetic recording medium. The magnetic recording medium is obtained by forming a protecting film 27 thereon.

The depth of the grating or the texture has influences on the size of individual crystal grains in the oriented film having the NaCl type crystallographic structure formed thereon and if film formation is effected under same conditions, smaller crystal grains are formed with smaller depth and smaller pitch in the unevenness. A region of preferable sizes of crystal grains of the material having the hcp structure constituting the magnetic film is comprised between 2 nm and 100 nm. In order to form such a magnetic film, the depth of the grating or the texture is preferably greater than 2 nm and smaller than 1 μm and it is desirable that the pitch is greater than 1 nm and smaller than 500 nm. If the pitch is smaller than 1 nm, the grapho-epitaxial growth hardly takes place. On the contrary, if it is greater than 500 nm, it is difficult to align the easy magnetization axis of the magnetic film in the circumferential direction of the disk.

According to a third aspect of the invention of the present application, the underlayer is a single layer.

Even if the material having the bcc crystallographic structure is omitted among the films constituting the magnetic recording medium described above, as indicated in FIG. 7, it is possible to obtain a magnetic recording medium, in which the easy magnetization axis of the magnetic film having the hop structure made of a Co based alloy is parallel to the substrate and the distribution thereof is controlled with respect to the substrate similarly to that described above.

FIG. 8 shows a case where a single-crystal substrate 31 having a {100} plane as a substrate surface, made of a material having the NaCl type crystallographic structure, is used. Since for the film having the bcc structure the {100} plane grows epitaxially and for the hcp structure the {11$\bar{2}$0} plane grows epitaxially, the easy magnetization axis is parallel to the substrate. Usually mismatch exists in the lattice constant between the substrate and the material having the bcc crystallographic structure. In order to alleviate this mismatch, sub-grain boundaries are formed on the films made of the materials having the bcc and the hcp crystallographic structure. It is possible to control the size of the crystal grains divided by these sub-grain boundaries so as to be in a region comprised between 5 and 100 nm, which is preferable for magnetic recording, by regulating conditions, under which the film is formed, e.g. temperature of the substrate and film formation speed. The surface of this substrate 31 can be also subjected to texture processing, as indicated in FIGS. 6A and 6B.

FIG. 9 is a schematical diagram showing the cross-sectional construction of a magnetic recording medium constructed by forming a Co based alloy magnetic film having the hcp structure directly on the single-crystal substrate having the NaCl type crystallographic structure and the {100} plane, omitting the film made of a material having the bcc structure in FIG. 8. Also in this case the easy magnetization axis of the magnetic film is parallel to the substrate and effects similar to those obtained in the case indicated in FIG. 8 are obtained.

The magnetic recording medium using a single-crystal substrate indicated in FIGS. 8 and 9 can be used for magnetic recording in the form of a disk-shaped magnetic disk. In this case, the direction of the easy magnetization axis in the magnetic recording medium with respect to the magnetic head varies, depending on the direction of the disk, which gives rise to variations e.g. in a reproduced output. However these are variations taking place with a period with respect to the crystallographic orientation and it is possible to correct them at recording and reproduction. Further, when a magnetic recording medium formed on a rectangular single-crystal substrate is combined with a magnetic head effecting a simple oscillation movement over the substrate, it can be used as a new magnetic recording system. When the magnetic recording medium is moved in a direction perpendicular to the movement of the magnetic head, data can be recorded on the rectangular magnetic recording medium and reproduced therefrom.

Next a fourth aspect according to the invention of the present application will be explained. When using a <110> single-crystal or a <110> oriented film having an NaCl crystallographic structure as a substrate or an underlayer, an underlayer material having a body centered cubic (bcc) structure is formed thereon, a single-crystal or an oriented film, whose {211} plane is parallel to the substrate, is obtained. When a Co based alloy magnetic film having a hexagonal close packed (hcp) structure is formed on this film, a single-crystal or oriented magnetic film, whose {1$\bar{1}$00} is parallel to the substrate, is obtained. In this case the [0001] axis of the magnetic film, which is the easy magnetization axis, is parallel to the substrate.

Also when the Co based alloy magnetic film having the hexagonal close packed (hcp) structure is formed directly on the <110> single-crystal or the <110> oriented film having the NaCl crystallographic structure, the [0001] axis of the magnetic film, which is the easy magnetization axis, is parallel to the substrate. In the case where a film having a bcc structure is used, since it is possible to regulate the diameter of crystal grains and the distance between crystal grains in a state where the <211> orientation is maintained by controlling film forming conditions, this construction has a feature that micro structure of the magnetic recording medium can be controlled and therefore it may be utilized, depending on the purpose of utilization.

As a method for forming a <110> oriented film made of a material having the NaCl structure on a substrate serving as a base, the grapho-epitaxial growth method described previously can be used.

By using this method, it is possible to control the easy magnetization axis of the magnetic film so as to be parallel to the surface of the substrate and further to align the easy magnetization axis in a predetermined direction with respect to the circumferential direction for a disk-shaped substrate. In this way it can be aligned in the same direction as the recording direction at magnetic recording and as the result, characteristics of the in-plane magnetic recording medium can be improved. Since distribution of crystal grains in the magnetic film can be also controlled, it is possible to provide a magnetic medium suitable for a high-density magnetic recording.

Furthermore, in case where the magnetic recording medium is used, combined with a magnetic head, taking it into account to realize a high track density, grooves or recesses may be disposed or non-magnetic regions or regions having different optical reflectivities may be formed on the magnetic recording medium fabricated by the method described above.

FIG. 10 is a cross-sectional perspective view of a part of a disk-shaped magnetic disk according to a mode of realization of the present invention. This mode of realization will be explained, referring to this figure. V-shaped grating or texture 42 having e.g. an apex angle θ of about 90° is formed in a surface portion of a non-magnetic substrate 41, whose outer shape is a circle. When a material having the NaCl type crystallographic structure is grown grapho-epitaxially thereon as the second underlayer, an oriented film 43, whose surface is a {110} plane, is obtained.

It is useful to align the direction of the grating or the texture in the circumferential direction of the disk. In this case, the grating or the texture is not necessarily continuous over the whole periphery, but it may be discontinuous. The material having the NaCl type crystallographic structure has a tendency that a {100} plane develops. If there is unevenness, whose apex angle is about 90°, as indicated in FIG. 10, the {100} plane grows parallelly to inclined surfaces. As the result, the surface of the film, which is parallel to the base substrate, is a {110} plane. Even if there are deviations in the apex angle by about 30° around 90°, an oriented film having the NaCl type crystallographic structure, which has the {110} plane parallel to the base substrate, is obtained. Further, even if there are errors of about several tens of % in the depth of individual recess portions with respect to an average depth, a film having the NaCl type crystallographic structure, in which the {110} plane is dominant, can be obtained. In the case where it is desired that the surface of the film is flat, it is preferable to polish it after the grapho-epitaxial growth.

The [001] direction of individual crystal grains in the oriented film having the NaCl type crystallographic structure is approximately parallel to the direction of stripes in the grating or the texture, i.e. parallel to the circumferential direction of the disk-shaped substrate. When a film having the bcc structure is formed on this film as the first underlayer, an oriented film 44, whose {211} plane is parallel to the base substrate, is grown by the epitaxial phenomenon. Then, when a Co based alloy magnetic film having the hcp structure is formed thereon, an oriented film 45, whose {1$\bar{1}$00} plane is parallel to the base substrate, is grown by the epitaxial phenomenon. In this way the easy magnetization axis [0001] of the magnetic film is parallel to the substrate and in addition it is approximately parallel to stripes of the grating or the texture, i.e. parallel to the circumferential direction of the disk-shaped substrate. Thus a magnetic recording medium is obtained by forming a protective film 46 thereon.

The depth of the grating or the texture has influences on the size of individual crystal grains in the oriented film having the NaCl type crystallographic structure formed thereon and if the film is formed under a same condition, smaller crystal grains are formed with smaller depth. Desirable sizes of the crystal grains in the material having the hcp structure constituting the magnetic film are in a region comprised between 2 nm and 100 nm. For forming such a magnetic film it is preferable that the depth of the grating or the texture is greater than 1 nm and smaller than 200 nm. Further an average pitch of the protruding portions in the texture is preferably greater than 1 nm and smaller than 500 nm in the radial direction of the disk-shaped substrate. If the pitch is smaller than 1 nm, the grapho-epitaxial growth hardly takes place and on the other hand, if it is greater than 500 nm, it is difficult to align the easy magnetization axis of the magnetic film in the circumferential direction of the disk.

FIG. 11 is a schematical diagram showing the cross-sectional construction of a magnetic recording medium constructed by forming a Co based alloy magnetic film having the hcp structure directly on the <110> oriented film having the NaCl type crystallographic structure, omitting the film 44 made of a material having the bcc structure from the construction indicated in FIG. 10. Also in this case the easy magnetization axis of the magnetic film 45' is parallel to the substrate and effects similar to those described above are obtained.

FIG. 12 shows a case where dispersed grating or texture is formed on a non-magnetic substrate 51, in which a film 54 made of a material having the bcc crystallographic structure formed directly on the unevenness has a <211> orientation, while a Co based alloy magnetic film 55 having the hcp crystallographic structure exhibits a <1$\bar{1}$00> orientation. Further, since the easy magnetization of the magnetic film formed directly on the unevenness lies in the direction of the texture or the grating and crystal grains on the substrate are also distributed in that direction, preferable effects equivalent to those obtained in the cases described previously are obtained at magnetic recording. In this case, it is necessary that the distance between recess portions and protruding portions adjacent to each other is smaller than a fraction of the width of the magnetic recording defined by the width of track of a magnetic head. In order to achieve a magnetic recording density greater than 1 Gb/in2, it is preferably smaller than 100 nm.

FIG. 13 is a schematical diagram showing the cross-sectional construction of a magnetic recording medium constructed by forming a Co based alloy magnetic film 55' having the hcp structure directly on the <110> oriented film 53 having the NaCl type crystallographic structure, omitting the film 54 made of a material having the bcc structure in FIG. 12. Also in this case the easy magnetization axis of the magnetic film is parallel to the substrate and effects similar to those obtained in the case indicated in FIG. 12 are obtained.

FIG. 14 shows a case where a single-crystal substrate 61 made of a material having the NaCl crystallographic structure, in which the surface of the substrate is a {110} plane. Since a {211} plane grows epitaxially in the film 62 having the bcc structure and a {1$\bar{1}$00} plane grows epitaxially in the film 63 having the hcp structure, the easy magnetization axis is parallel to the substrate. Mismatch exists usually in the lattice constant between the substrate and the material having the bcc crystallographic structure. In order to alleviate this mismatch, sub-grain boundaries are formed on the films made of materials having the bcc and the hcp crystallographic structure. It is possible to control the size of the crystal grains divided by these sub-grain boundaries so as to be in a region comprised between 5 and 100 nm, which is preferable for magnetic recording, by regulating conditions, under which the film is formed, e.g. temperature of the substrate and film formation speed. The surface of this substrate 61 can be subjected to texture processing, as indicated in FIG. 10 or FIG. 12.

FIG. 15 is a schematical diagram showing the cross-sectional construction of a magnetic recording medium constructed by forming a Co based alloy magnetic film 63' having the hcp structure directly on the (110) oriented single-crystal substrate 61 having the NaCl type crystallographic structure, omitting the film 62 made of a material having the bcc structure in FIG. 14. Also in this case the easy magnetization axis of the magnetic film is parallel to the substrate and effects similar to those obtained in the case indicated in FIG. 12 are obtained.

The magnetic recording medium using a single-crystal substrate indicated in FIGS. 14 and 15 can be used for magnetic recording in the form of a disk-shaped magnetic disk. In this case, the direction of the easy magnetization axis in the magnetic recording medium with respect to the magnetic head varies, depending on the direction of the disk, which gives rise to variations e.g. in a reproduced output. However these are variations taking place with a period with respect to the crystallographic orientation and it is possible to correct them at recording and reproduction. Further, when a magnetic recording medium formed on a rectangular single-crystal substrate is combined with a magnetic head effecting a simple oscillation movement over the substrate, it can be used as a new magnetic recording system. When the magnetic recording medium is moved in a direction perpendicular to the movement of the magnetic head, data can be recorded on the rectangular magnetic recording medium and reproduced therefrom.

Another aspect of the present invention indicates a new combination of a substrate made of a hard non-magnetic material such as glass, etc. with an underlayer. A construction, in which a layer made of an NaCl type crystal material is superposed on a glass substrate as a second underlayer, as indicated by an embodiment, has not been known heretofore.

Still another aspect of the present invention consists in that a plane defining the direction of the crystal growth in the underlayer is formed on a surface of a substrate. For example, a second underlayer 24 grows along a side surface of a protruding portion 23 in FIG. 5. If there is not such a surface defining the direction of the crystal growth, although the direction of the orientation of individual crystal grains in the underlayer is defined, (a crystal, whose surface is a {100} plane, grows in FIG. 5), the direction of oriented planes is diverged (the direction [010] or [001] of the crystal is irregular). Therefore, although the easy magnetization axis 71 of the magnetic film is parallel to the magnetic film, the direction thereof is diverged, as indicated in FIG. 16A. On the other hand, if there are faces 73 and 75 defining crystals, as indicated in FIG. 16B, since crystals grow along the faces, the direction of easy magnetization axes is determined according to a certain rule. In certain cases, crystals having easy magnetization axes parallel to the faces 73 and 75 and crystals having easy magnetization axes perpendicular to those faces can exist mixedly. The state indicated in FIG. 16B has a magnetic anisotropy greater than that obtained in the state indicated in FIG. 16A and from the point of view of magnetic characteristics it can be said that the former is more excellent than the latter.

Further the size of crystal grains grown between the faces 73 and 75 can be kept approximately constant by keeping the distance therebetween constant, as indicated in FIG. 16B. Therefore, since the size of crystal grains in the magnetic film is kept constant, directions of easy magnetization axes are aligned, and divergence thereof among different crystal grains is small, it is possible to obtain properties of matter desirable as a magnetic recording medium.

BRIEF DESCRIPTION OF THE DRAWINGS

These and other objects and technical advantages of the present invention will be readily apparent from the following description of the preferred exemplary embodiments of the invention in conjunction with the accompanying drawings, in which.

DESCRIPTION OF THE PREFERRED EMBODIMENTS

Figure 1:
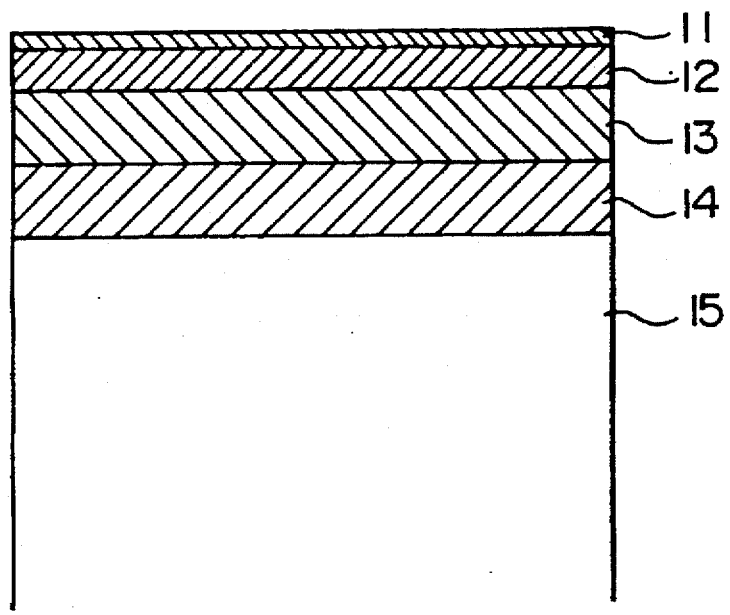
FIG. 1 is a cross-sectional view showing a fundamental construction of a magnetic recording medium according to the present invention.
Figure 2A:
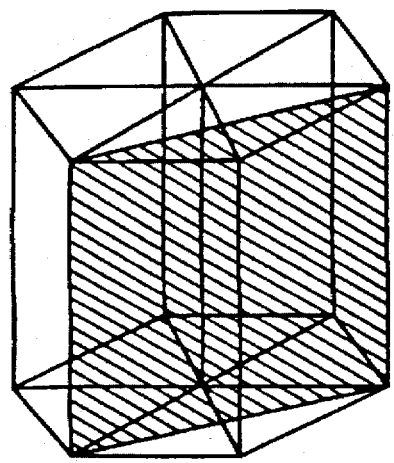
FIGS. 2A and 2B are perspective views indicating planes parallel to the c-axis in an h.c.p. structure.
Figure 2B:
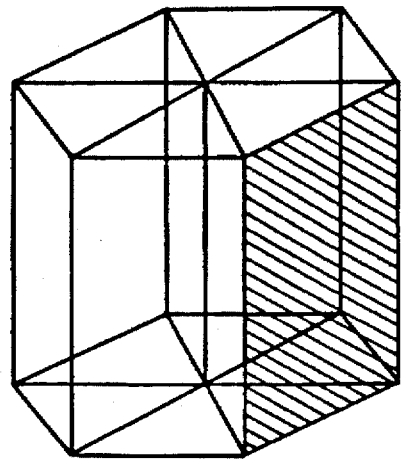
Figure 3:
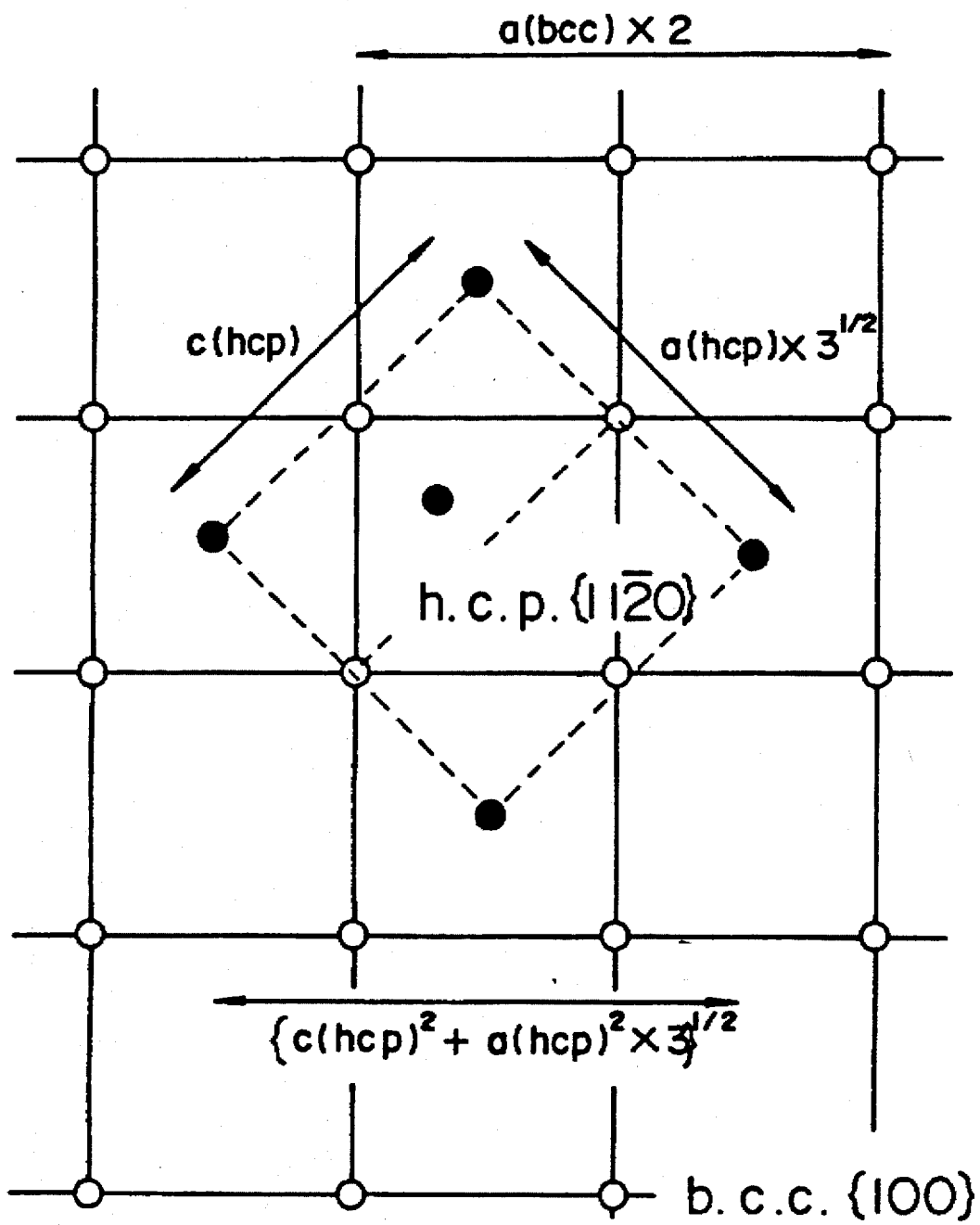
FIG. 3 is a plan view indicating a matching relation between a {11$\bar{2}$0} plane in an h.c.p. structure and a {100} plane in a b.c.c. structure.
Figure 4:
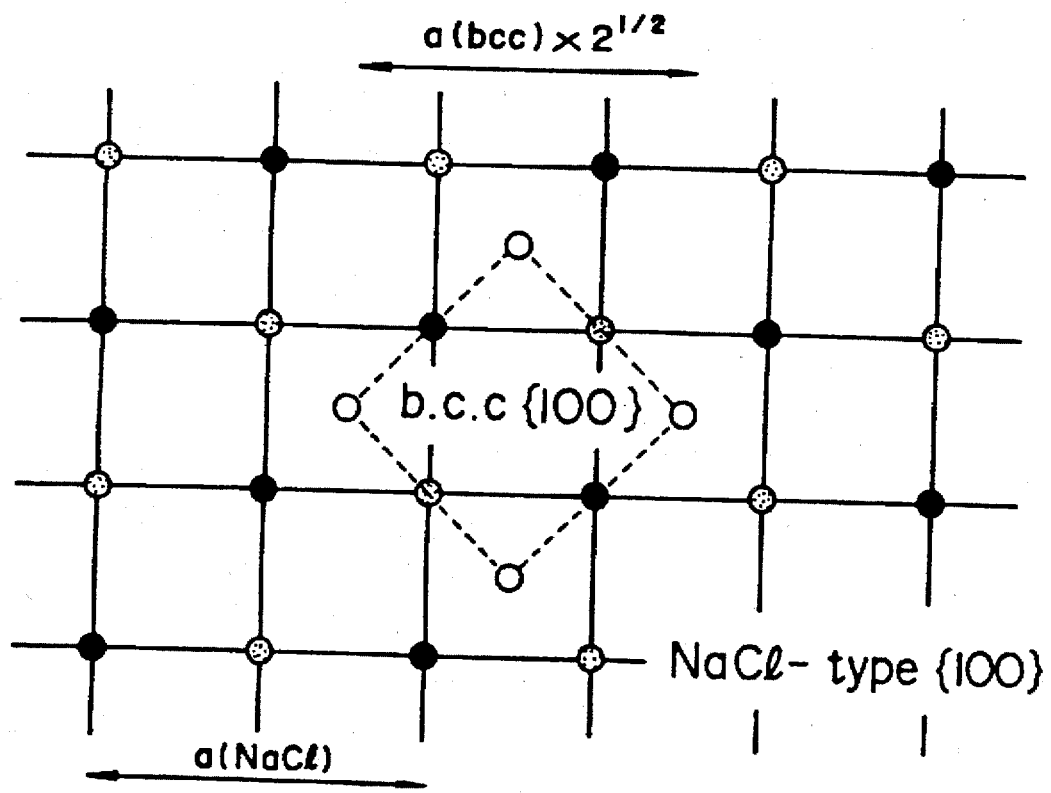
FIG. 4 is a plan view indicating a matching relation between a {100} plane in a b.c.c. structure and a {100} plane in an NaCl type structure.

Hereinbelow several embodiments of the present invention will be explained, referring to the drawings.

<Embodiment 1>

Figure 17:
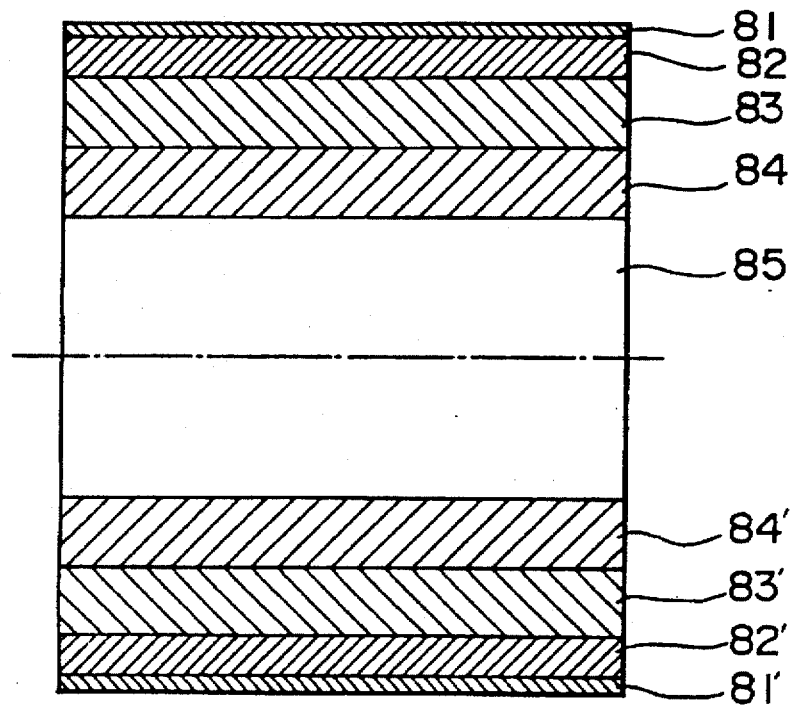
FIG. 17 is a cross-sectional view of a magnetic recording medium according to Embodiment 1 of the present invention.

Using a glass substrate having a diameter of 3.5 inches, a magnetic recording medium having a cross-sectional construction as indicated in FIG. 17 was fabricated by the radio frequency magnetron sputtering method. MgO underlayers 84, 84'; Cr underlayers 83, 83'; Co alloy magnetic films 82, 82'; and carbon protective films 81, 81' are formed in this order on two surfaces of the glass substrate 85. The MgO underlayers 84, 84' have an NaCl type crystallographic structure, while the Cr underlayers 83, 83' have a b.c.c. structure and the Co alloy magnetic films 82, 82' have an h.c.p. structure.

The MgO underlayers 84, 84' were formed by using an argon/oxygen mixed gas having a mixing ratio of 9/1 under a condition that the pressure of the gas was 0.5~1.5 Pa, the temperature of the substrate was 300° C. and the speed of the film formation was 3~5 nm per minute. The Cr underlayers 83, 83', the Co alloy magnetic films 82, 82'; and the carbon protective films 81, 81' were formed by using argon gas under a condition that the pressure of the gas was 0.7 Pa, the temperature of the substrate was 150° C. and the speed of the film formation was 50 nm per minute. The composition of a target used for forming the magnetic films 82, 82' was Co-15 at. % Cr-8 at. % Pt. Concerning the thickness of the various films, the MgO underlayers were 50 nm thick, the Cr underlayers were 50 nm thick, the Co alloy magnetic films were 30 nm thick, and the carbon protective films were 10 nm thick. The formation of all the films described above was effected continuously in a same vacuum chamber without breaking vacuum.

Crystallographic orientation and magnetic characteristics of a sample thus prepared were measured by X-ray diffraction and by using a vibrating sample magnetometer (VSM), respectively. Compared with a magnetic recording medium prepared without MgO underlayers under otherwise completely identical conditions, both the <100> orientation of the Cr underlayers and the <11$\bar{2}$0> orientation of the Co alloy magnetic films were remarkably improved. The coercive force in the in-plane direction of the film was increased by 9.3% (140 Oe) and the squareness ratio is increased by 11% (0.09).

The difference between Formula 1 and Formula 2 described previously calculated from the respective crystallographic structures of the Co alloy magnetic film, the Cr underlayer and the MgO underlayer in this magnetic recording medium is −3.8% and the difference between Formula 3 and Formula 4 is −3.2%.

<Embodiment 2>

Figure 18:
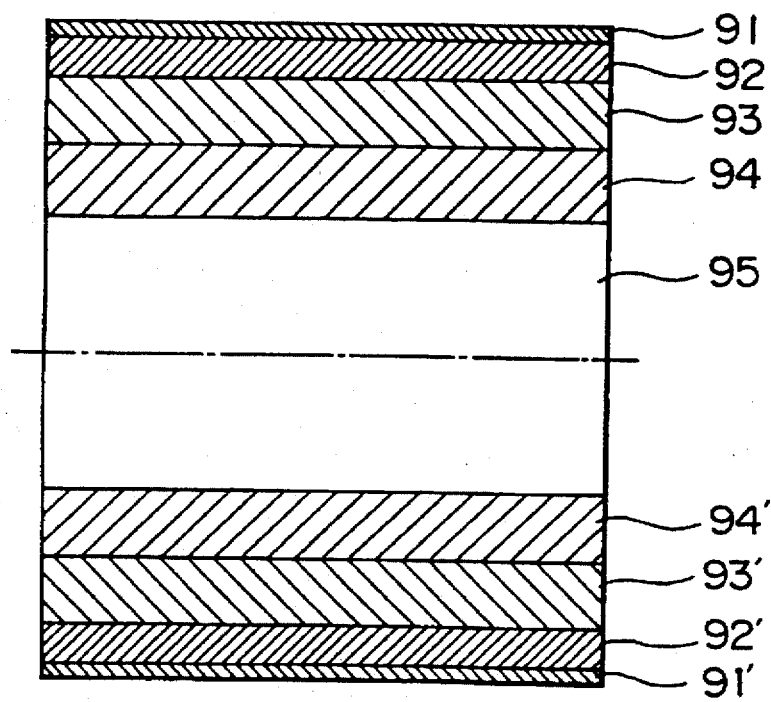
FIG. 18 is a cross-sectional view of a magnetic recording medium according to Embodiment 2 of the present invention.

Using a glass substrate having a diameter of 3.5 inches, a magnetic recording medium having a cross-sectional construction as indicated in FIG. 18 was fabricated by the radio frequency magnetron sputtering method. LiF underlayers 94, 94'; Cr underlayers 93, 93'; Co alloy magnetic films 92, 92'; and carbon protective films 91, 91' are formed in this order on two surfaces of the glass substrate 95. The LiF underlayers 94, 94' have an NaCl type crystallographic structure, while the Cr underlayers 93, 93' have a b.c.c. structure and the Co alloy magnetic films 92, 92' have an h.c.p. structure.

The LiF underlayers 94, 94' were formed by using argon gas under a condition that the pressure of the gas was 0.5~1.5 Pa, the temperature of the substrate was 300° C. and the speed of the film formation was 3~5 nm per minute. The Cr underlayers 93, 93', the Co alloy magnetic films 92, 92'; and the carbon protective films 91, 91' were formed under the same condition as that used in Embodiment 1. The composition of a target used for forming the magnetic films 92, 92' was Co-12 at. % Cr-2 at. % Pt. Concerning the thickness of the various films, the LiF underlayers were 50 nm thick, the Cr underlayers were 50 nm thick, the Co alloy magnetic films were 30 nm thick, and the carbon protective films were 10 nm thick. The formation of all the films described above was effected continuously in a same vacuum chamber without breaking vacuum.

Crystallographic orientation and magnetic characteristics of a sample thus prepared were measured by X-ray diffraction and by using a vibrating sample magnetometer (VSM), respectively. As the result, for the magnetic recording medium in the present embodiment, compared with a magnetic recording medium prepared without LiF underlayers under otherwise completely identical conditions, both the <100> orientation of the Cr underlayers and the <11$\bar{2}$0> orientation of the Co alloy magnetic films were remarkably improved. The coercive force in the in-plane direction was increased by 12% (130 Oe) and the squareness ratio was increased by 9.9% (0.08).

Further magnetic recording media completely identical to that obtained in the embodiment described above, except that V, Mo, W or Cr-3 at. % Si alloy was used in lieu of the Cr underlayers, were fabricated. Also for these magnetic recording media, compared with respective examples for comparison, in which no LiF underlayers were disposed, it was verified that both the <100> orientation of the b.c.c. underlayers and the <11$\bar{2}$0> orientation of the Co alloy magnetic films were remarkably improved. The coercive force and the squareness ratio were also increased. These results are indicated in TABLE 1.

TABLE 1

| | FIRST UNDER-LAYER | SECOND UNDER-LAYER | COERSIVE FORCE (Oe) | INCREMENT IN COERSIVE FORCE (%) | SQUARE-NESS RATIO | INCREMENT IN SQUARENESS RATIO (%) |
|---|---|---|---|---|---|---|
| EXAMPLE FOR COMPARISON | Cr | NON | 1150 | — | 0.81 | — |
| PRESENT INVENTION | Cr | LiF | 1280 | 12 | 0.89 | 9.9 |
| EXAMPLE FOR | V | NONE | 1120 | — | 0.80 | — |

TABLE 1-continued

|  | FIRST UNDER-LAYER | SECOND UNDER-LAYER | COERSIVE FORCE (Oe) | INCREMENT IN COERSIVE FORCE (%) | SQUARE-NESS RATIO | INCREMENT IN SQUARENESS RATIO (%) |
|---|---|---|---|---|---|---|
| COMPARISON |  |  |  |  |  |  |
| PRESENT INVENTION | V | LiF | 1220 | 8.9 | 0.86 | 7.5 |
| EXAMPLE FOR COMPARISON | Mo | NONE | 1100 | — | 0.78 | — |
| PRESENT INVENTION | Mo | LiF | 1190 | 8.2 | 0.85 | 9.0 |
| EXAMPLE FOR COMPARISON | W | NONE | 1110 | — | 0.80 | — |
| PRESENT INVENTION | W | LiF | 1170 | 5.4 | 0.84 | 5.0 |
| EXAMPLE FOR COMPARISON | Cr—Si | NON | 1160 | — | 0.80 | — |
| PRESENT INVENTION | Cr—Si | LiF | 1270 | 9.5 | 0.88 | 10 |

Furthermore also for magnetic recording media, in which Nb, Ta, Cr-5 at. % Nb alloy or Cr-10 at. % Mo alloy was used for the first underlayer, compared with respective examples for comparison, in which no LiF underlayers were disposed, it was confirmed that both the orientation and the magnetic characteristics were improved.

<Embodiment 3>

Using a glass substrate having a diameter of 3.5 inches, a magnetic recording medium having a cross-sectional construction as indicated in FIG. 18, similarly to that described in Embodiment 2, was fabricated by the radio frequency magnetron sputtering method. LiF underlayers 94, 94'; Cr underlayers 93, 93'; Co alloy magnetic films 92, 92'; and carbon protective films 91, 91' are formed in this order on two surfaces of the glass substrate 95.

The LiF underlayers 94, 94' were formed by using argon gas under a condition that the pressure of the gas was 0.5~1.5 Pa, the temperature of the substrate was 300° C. and the speed of the film formation was 3~5 nm per minute. The Cr underlayers 93, 93', the Co alloy magnetic films 92, 92'; and the carbon protective films 91, 91' were formed under the same condition as that used in Embodiment 1. The composition of a target used for forming the magnetic films 92, 92' was Co-18 at. % Cr-6 at. % Pt in the present embodiment. Concerning the thickness of the various films, the LiF underlayers were 50 nm thick, the Cr underlayers were 50 nm thick, the Co alloy magnetic films were 30 nm thick, and the carbon protective films were 10 nm thick. The formation of all the films described above was effected continuously in a same vacuum chamber without breaking vacuum.

Further magnetic recording media, in which NaF, TiC, VC and TiN having same NaCl type crystallographic structures were used in lieu of the LiF underlayers, were fabricated under conditions similar to those described previously. Crystallographic orientation and magnetic characteristics of samples thus prepared were measured by X-ray diffraction and by using a vibrating sample magnetometer (VSM), respectively. As the result, for all the magnetic recording media in the present embodiment, compared with a magnetic recording medium prepared without underlayers having the NaCl type crystallographic structure under otherwise completely identical conditions, both the <100> orientation of the Cr underlayers and the <11$\bar{2}$0> orientation of the Co alloy magnetic films were remarkably improved and increase in the coercive force in the in-plane direction and the squareness ratio was confirmed. These results are indicated in TABLE 2.

TABLE 2

|  | FIRST UNDER-LAYER | SECOND UNDER-LAYER | COERSIVE FORCE (Oe) | INCREMENT IN COERSIVE FORCE (%) | SQUARE-NESS RATIO | INCREMENT IN SQUARENESS RATIO (%) |
|---|---|---|---|---|---|---|
| EXAMPLE FOR COMPARISON | Cr | NON | 1350 | — | 0.80 | — |
| PRESENT INVENTION | Cr | LiF | 1500 | 11 | 0.88 | 10 |
|  | Cr | NaF | 1380 | 2.2 | 0.81 |  |
|  | Cr | TiC | 1410 | 4.4 | 0.85 | 6.4 |
|  | Cr | VC | 1450 | 7.4 | 0.84 | 5.0 |
|  | Cr | TiN | 1390 | 3.0 | 0.82 | 2.5 |

Further magnetic recording media, in which KBr, RbI, HfC, NbC, TaC, VN, ZrN, ZrC, (Ti, V)C, or mixed crystals, whose main component was these inorganic compounds, was used for the second underlayer, were prepared. It was confirmed that similar effects can be obtained also for these magnetic recording media.

<Embodiment 4>

Figure 19:
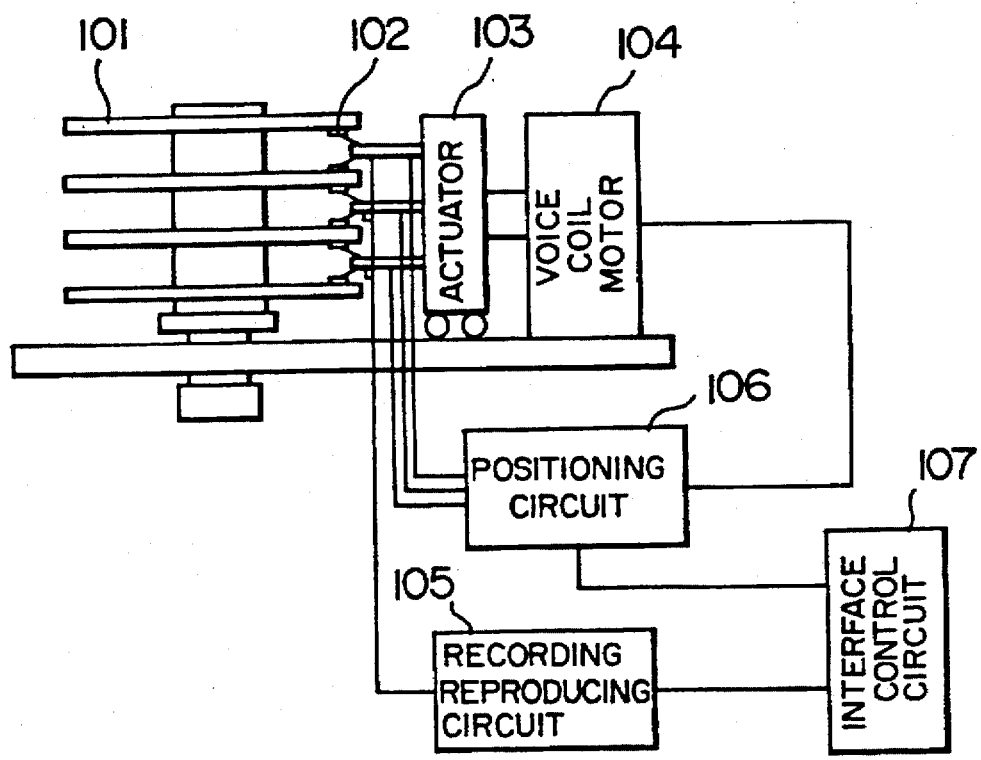
FIG. 19 is a schematical diagram showing an embodiment of a magnetic recording apparatus according to the present invention.

FIG. 19 is a schematic diagram of an embodiment of a magnetic recording apparatus. Magnetic recording media 101 are held by a holder rotated by a motor and a composite head 102 using magneto-resistive effect sensor for writing-in and reading-out information is disposed so that each of them corresponds to each of magnetic films. The composite head 102 using magneto-resistive effect sensors is moved by an actuator 103 and a voice coil motor 104 with respect to the magnetic recording medium 102. Further there are disposed a recording/reproducing circuit 105, a positioning circuit 106 and an interface control circuit 107 for controlling them.

When the magnetic recording mediums fabricated in the different embodiments were used to be applied to this magnetic recording apparatus, for all the cases it was possible to record data at a high S/N ratio and a high density.

According to Embodiments 1 to 3, it was possible to provide a magnetic recording medium having an increased coercive force in the in-plane direction and squareness ratio, which is suitable for magnetic recording at a higher density. Further it was possible to provide a magnetic recording apparatus capable of high-density recording at a high S/N ratio.

<Embodiment 5>

Figure 5:
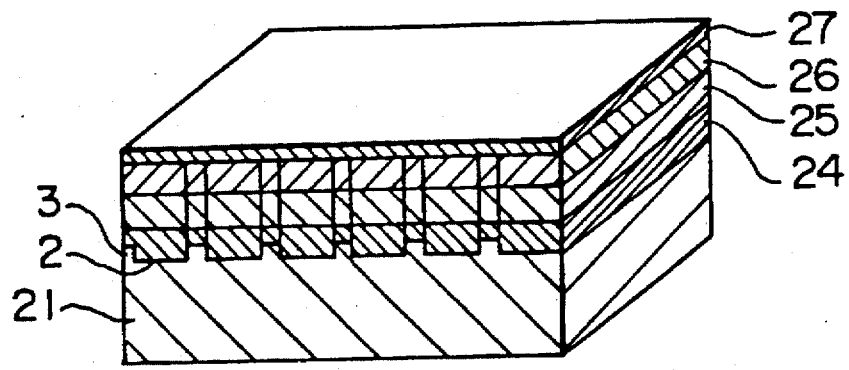
FIG. 5 is a schematical diagram showing cross-sectional construction of a magnetic recording medium according to Embodiment 5 of the present invention.
Figure 6A:
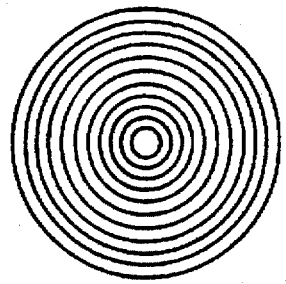
FIGS. 6A and 6B are diagrams for explaining configuration of grating formed in a surface portion of a substrate.
Figure 6B:
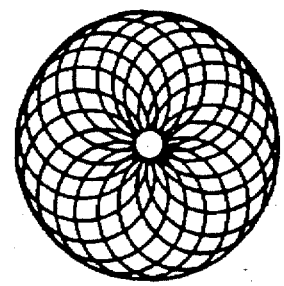

Concentric grating having a depth of 50 nm and a pitch of 100 nm was formed in a surface portion of a quartz glass substrate 21 having a diameter of 1.8 inches by using photoresist, as indicated in FIG. 5. Protruding portions 23 were 20 nm wide, while recess portions 22 were 80 nm wide. A magnetic recording medium was fabricated by a process indicated below by using this substrate.

An LiF film 24 100 nm thick having an NaCl structure was formed by the radio frequency sputtering method, while keeping the substrate 21 at a high temperature. After the formation of the film, it was subjected to heat treatment in an electric oven, kept in an inert gas atmosphere. The LiF film was examined by the X-ray diffraction method. As the result, it was confirmed that the LiF film was an oriented polycrystalline film, whose {100} plane was approximately parallel to the substrate and further that the [001] orientation of crystal grains was distributed approximately concentrically. Micro structure of the LiF film was examined by means of a scanning electron microscope and it was verified that it was composed of crystal grains having grain sizes between 50 nm and 100 nm and further that there existed unevenness of 30 to 100 nm on the surface.

After having polished the surface so as to be flat, a Cr film 25 50 nm thick having a bcc crystallographic structure and a Co—Cr—Pt film 26 30 nm thick having an hcp crystallographic structure were formed thereon by the radio frequency magnetron sputtering method. A Co-18 at % Cr-6 at % Pt target was used for forming the magnetic film. The temperature of the substrate was 400° C. at the formation of the Cr film and 180° C. at the formation of the Co—Cr—Pt magnetic film. The Ar gas pressure at sputtering was 10 mTorr and sputter power was 6 W/cm$^2$. Further a carbon film 10 nm thick was formed as a protective film 27 to fabricate the magnetic recording medium. The structure of the film was examined by the X-ray diffraction and it was confirmed that the Cr film was a <100> oriented polycrystalline film, while the Co—Cr—Pt film was a <11$\bar{2}$0> oriented polycrystalline film.

Magnetic recording media were fabricated under the same conditions as described above, using V, Nb, Mo, Cr-5 at % Ti, Cr-2 at % Zr, Cr-20 at % V and Cr-1 at % B in lieu of Cr. As the result, it was confirmed by the X-ray diffraction method that structures similar to those described above were realized both for the underlayer having the bcc structure and the magnetic film having the hcp structure.

A magnetic recording medium was fabricated as a sample for comparison, in which the Cr film, the Co—Cr—Pt magnetic film and the C protective film were formed under the same conditions as described above directly on a quartz glass substrate on which no grating was formed. As a result of X-ray diffraction it was confirmed that the Cr film exhibited configuration, in which two sorts of orientations, i.e. <100> and <110>, were mixed, that in the magnetic film there existed mixedly crystal grains, whose easy magnetization axis was parallel to the substrate, and crystal grains, whose easy magnetization axis was inclined by about 30° with respect to the substrate, and that directions of the easy magnetization axis were distributed irregularly in the plane of the substrate.

Evaluation of recording/reproduction characteristics of these magnetic recording media was effected by means of a thin film magnetic head. The magnetic head had a track width of 5 µm and a gap length of 0.2 µm. The distance between the magnetic head and the magnetic recording medium at measurement was 0.06 µm and the relative speed therebetween was 10 m/s. Recording density characteristics, S/N ratio and off-track characteristics were chosen as evaluation items. The recording density characteristics were measured as a half output recording density ($D_{50}$), at which a low frequency reproduced output is decreased to a half; the S/N ratio was measured as a relative value on the basis of an S/N ratio obtained for the sample for comparison; and the off-track characteristics were measured as a relative value of the magnetization spread out beyond the recorded track edge, compared with that obtained for the sample for comparison. Increasing value of the S/N ratio and decreasing value of the off-track characteristics indicate that they are more suitable for high-density magnetic recording.

From TABLE 3 it was verified that the magnetic recording medium according to the present embodiment is improved in all the recording density characteristics, the S/N ratio and the off-track characteristics with respect to the example for comparison and that it has characteristics desirable for a high density magnetic recording medium.

Experiments were effected also by using a <100> oriented film made of either one of LiCl, NaCl, KCl, MgO, CaO, TiO, VO, MnO, CoO, NiO, TiC, ZrC, EfC, NbC and TaC in lieu of LiF as a material having the NaCl type crystallographic structure. When a different material is used, the condition for the grapho-epitaxial growth varies. Thus it was necessary to select a film forming method suitable for a certain material or conditions such as substrate temperature at the film formation, heat treatment after the film formation, etc. However it was confirmed that in all the cases where these <100> oriented films are used, they have characteristics desirable for a high-density magnetic recording medium, which are similar to those described previously.

TABLE 3

|  | EXAMPLE FOR COMPARISON | EMBODIMENT 5 | | | | | | | |
|---|---|---|---|---|---|---|---|---|---|
| NaCl STRUCTURE FILM | NONE | <100> | | | | | | | |
| bcc STRUCTURE FILM | Cr | Cr | V | Mb | Mo | Cr—Ti | Cr—Zr | Cr—V | Cr—B |
| RECORDING DENSITY ($D_{50}$ (kFCI)) | 65 | 82 | 80 | 73 | 70 | 86 | 82 | 79 | 84 |
| S/N RATION (RELATIVE VALUE) | 1 | 1.6 | 1.5 | 1.2 | 1.5 | 1.7 | 1.8 | 1.4 | 1.4 |
| OFF-TRACK CHARACTERISTICS (RELATIVE VALUE) | 1 | 0.7 | 0.7 | 0.8 | 0.7 | 0.5 | 0.5 | 0.6 | 0.5 |

<Embodiment 6>

Figure 7:
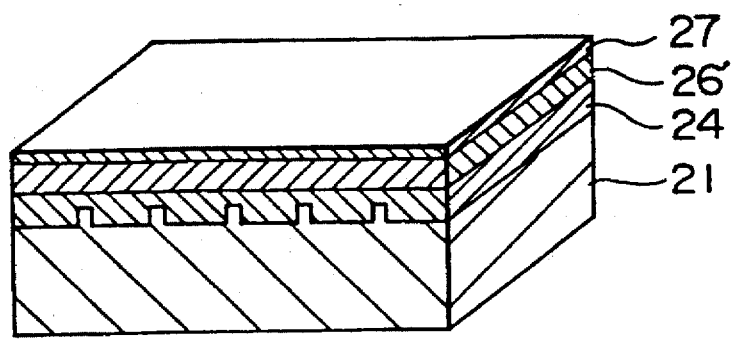
FIG. 7 is a schematical diagram showing cross-sectional construction of a magnetic recording medium according to Embodiment 6 of the present invention.

An oriented film 24 having the NaCl structure, an oriented film 26' having the hcp structure and a protective film 27 were formed one after another on a surface of a quartz glass substrate 21 having a diameter of 1.8 inches, in a surface portion of which concentric grating having a depth of 50 nm and a pitch of 100 nm was formed by a process similar to that described previously in Embodiment 5, except that the film formation using the material having the bcc crystallographic structure was omitted, to fabricate a magnetic recording medium having the structure indicated in FIG. 7.

For the magnetic film a binary alloy selected from the group consisting of Co-18 at % Cr, Co-12 at Ni, Co-18 at % Fe, Co-20 at % V, Co-20 at % Mo, Co-16 at % Ta, Co-20 at % Re, Co-16 at % Pt and Co-15 at % Pd; a ternary alloy selected from the group consisting of Co-18 at % Cr-2 at % Ta, Co-21 at % Cr-3 at % Mo, Co-19 at % Cr-1.5 at % W, Co-15 at Cr-7 at % Re, Co-14 at % Ni-1 at % Zr, Co-16 at % Pt-2 at % Ta, and Co-18 at % Pt-0.8 at % B; or a quarternary alloy selected from the group consisting of Co-18 at % Cr-2 at % Ta-2 at % B, Co-20 at % Cr-1.5 at % Ta-0.3 at % Si, Co-19 at % Cr-2.5 at % Ta-0.8 at % C, Co-22 at % Cr-1.6 at % Ta-0.2 at % P, Co-21 at % Cr-1 at % Ta-0.2 at % N, Co-12 at % Cr-8 at % Pt-0.7 at % B, was used.

Magnetic recording media were prepared for samples for comparison, in each of which a Cr film 50 nm thick serving as an underlayer was formed on a flat quartz glass substrate, then one of the magnetic films described above was formed thereon, and finally a C protective film was formed further thereon.

Linear densities ($D_{50}$: kFCI) among recording/ reproduction characteristics of magnetic recording media obtained by using <100> oriented films of NiO as the material having the NaCl crystallographic structure were as indicated in TABLE 4.

For the S/N ratio and the off-track characteristics other than the linear density, it was verified that characteristics of the magnetic recording media according to the present embodiment were improved by more than 10% with respect to samples for comparison having magnetic films of same compositions formed by using prior art Cr underlayers and that they were therefore excellent as high density magnetic recording media. Also in case where the magnetic films were formed on <100> oriented films having the NaCl crystallographic structure other than NiO, similar improvement effects were recognized.

TABLE 4

| MAGNETIC FILM | EXAMPLE FOR COMPARISON | EMBODIMENT 6 |
|---|---|---|
| NaCl STRUCTURE FILM | NONE | <100> ORIENTED NiO FILM |
| bcc STRUCTURE FILM | Cr | NONE |
| Co—Cr | 62 | 80 |
| Co—Ni | 58 | 76 |
| Co—Fe | 56 | 71 |
| Co—V | 60 | 75 |
| co—Mo | 58 | 70 |
| Co—Ta | 50 | 73 |
| Co—Re | 48 | 72 |
| Co—Pt | 56 | 70 |
| Co—Pd | 55 | 69 |
| Co—Cr—Ta | 65 | 82 |
| Co—Cr—Pt | 64 | 85 |
| Co—Cr—Mo | 61 | 81 |
| Co—Cr—W | 58 | 78 |
| Co—Cr—Re | 62 | 80 |
| Co—Ni—Zr | 62 | 81 |
| Co—Pt—Ta | 63 | 85 |
| Co—Pt—B | 66 | 83 |
| Co—Cr—Ta—B | 66 | 90 |
| Co—Cr—Ta—Si | 65 | 89 |
| Co—Cr—Ta—C | 64 | 80 |
| Co—Cr—Ta—P | 60 | 83 |
| Co—Cr—Ta—N | 62 | 82 |
| Co—Cr—Pt—B | 63 | 88 |

<Embodiment 7>

A groove, in which the protruding portion was 30 nm wide and the recess portion was 100 nm wide and 20 nm deep, was formed in a spiral form by the photolithographic method in a surface portion of a glass substrate having a diameter of 1.8 inches. A magnetic recording medium was prepared by a process described below, using this substrate.

A KCl film 50 nm thick was formed on the substrate by the radio frequency sputtering method. After the formation of the film, it was subjected to heat treatment in an electric oven kept in an gas atmosphere containing water vapor. The KCl film was examined by the X-ray diffraction method. As the result, it was verified that the KCl film was an oriented polycrystalline film, whose {100} plane was approximately parallel to the substrate. It was confirmed further that crystal grains were distributed approximately concentrically. Micro structure of the KCl film was examined by means of a scanning electron microscope and it was verified that it consisted of crystal grains having grain sizes of 30 to 100 nm and further that there existed unevenness of 20 to 50 nm on the surface.

After having polished the surface so as to be flat, a Cr-2 at % Zr film 50 nm thick having a bcc crystallographic structure and a Co—Cr—Ta film 20 nm thick having an hcp crystallographic structure were formed thereon by the radio frequency magnetron sputtering method. A Co-18 at % Cr-3 at % Ta target was used for forming the magnetic film. The temperature of the substrate was 300° C. at the formation of the Cr film and 150° C. at the formation of the Co—Cr—Pt magnetic film. The Ar gas pressure at sputtering was 3 to 10 mTorr and sputter power was 6 to 10 W/cm$^2$. Further a carbon film 10 nm thick was formed as a protective film to fabricate the magnetic recording medium. The structure of the film was examined by the X-ray diffraction and it was confirmed that the Cr film had a strong 200 diffraction line and thus it was a <100> oriented textured film, while the Co—Cr—Ta film was a <11$\bar{2}$0> oriented textured polycrystalline film.

A magnetic recording medium was fabricated by the same method as described above, in which a Co—Cr—Ta magnetic film was formed directly on the KCl film without forming the Cr—Zr film having the bcc crystallographic structure and a C protective film was formed further thereon.

A magnetic recording medium was fabricated as a sample for comparison, in which the Cr—Zr film, the Co—Cr—Ta film and the C protective film were formed directly on a flat quartz glass substrate.

Recording/reproduction characteristics were compared under conditions similar to those used in Embodiment 5. As a result it was confirmed that all the magnetic recording media according to the present invention, in which the KCl film exhibiting the <100> dominant orientation was disposed, were better by 25% in the linear density, by 40% in the S/N ratio and by 32% in the off-track characteristics than the sample for comparison.

Further, also in case where LiCl, NaCl or LiF was used as another material instead of the KCl film, similar desirable effects were confirmed.

<Embodiment 8>

Figure 8:
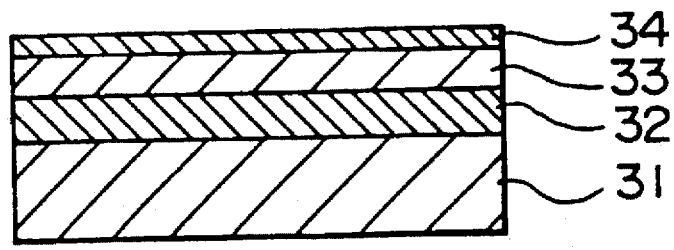
FIG. 8 is a cross-sectional view of a magnetic recording medium according to Embodiment 8 of the present invention.

A magnetic recording medium having a construction indicated in FIG. 8 was fabricated by a process described below, using a rectangular [100] MgO single-crystal 31, whose one side was 20 mm long, as a substrate.

A V film 32 30 nm thick having a bcc crystallographic structure and a Co—Cr—Ta—Si film 33 15 nm thick having an hcp crystallographic structure were formed thereon by the radio frequency magnetron sputtering method. A Co-19 at % Cr-2 at % Ta-2 at % Si target was used for forming the magnetic film. The temperature of the substrate was 450° C. at the formation of the V film and 150° C. at the formation of the Co—Cr—Ta—Si magnetic film. The Ar gas pressure at sputtering was 3 mTorr and sputter power was 10 W/cm$^2$. Further a boron film 34 10 nm thick was formed as a protective film to fabricate the magnetic recording medium.

The structure of the film was examined by the X-ray diffraction and it was confirmed that the V film grew epitaxially so that the {100} plane was parallel to the substrate and that the Co—Cr—Ta—Si film grew epitaxially so that the {11$\bar{2}$0} plane was parallel to the substrate. The structure of the magnetic recording medium was examined by means of a transmission electron microscope and it was found that sub-grain boundary existed in the magnetic film and that crystal grains divided by this sub-grain boundary had inclinations comprised between 0.3 and 1°. The average size of the crystal grains was 48 nm. Further the composition of the interior of the crystal grains was also examined and it was found that Cr and Si were segregated in the neighborhood of the sub-grain boundary. This magnetic recording medium had two sorts of easy magnetization axes, which were perpendicular to each other, and this direction corresponded to <001> of the [100] MgO substrate.

<Embodiment 9>

Figure 9:
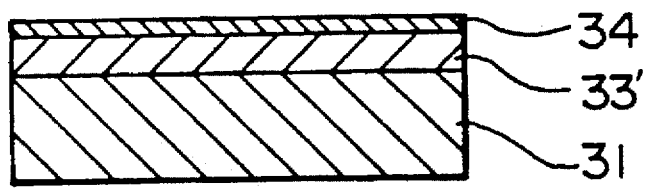
FIG. 9 is a cross-sectional view of a magnetic recording medium according to Embodiment 9 of the present invention.

A Co—Cr—Ta—Si magnetic film 33' was formed directly on a [100] MgO substrate by a method similar to that used in Embodiment 8 without forming any V film having the bcc crystallographic structure. A magnetic recording medium having the construction indicated in FIG. 9 was fabricated, in which a C protective film 34 was formed further thereon. Also in this magnetic recording medium the easy magnetization axis was aligned in <001> of the [100] MgO substrate in the same way as described previously.

<Embodiment 10>

Figure 20:
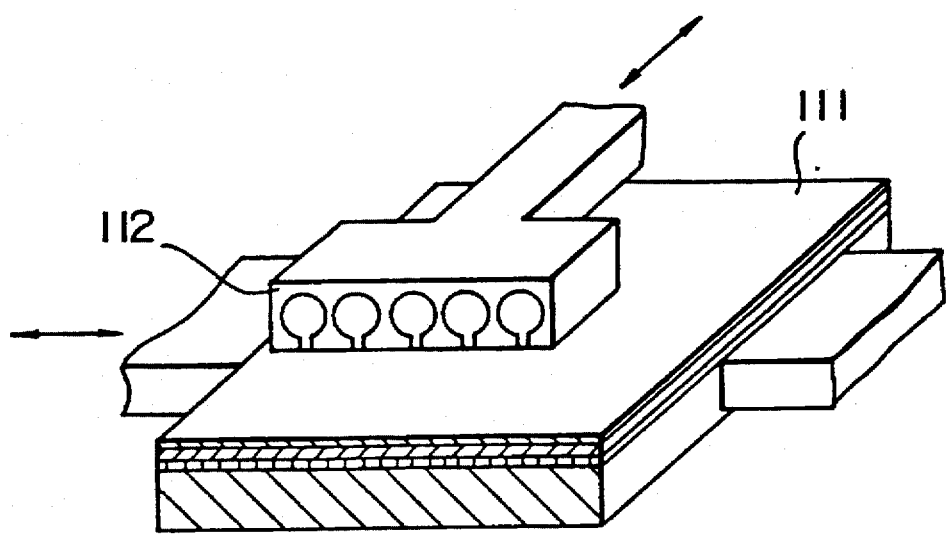
FIG. 20 is a diagram indicating the construction of a magnetic recording apparatus according to Embodiment 10 of the present invention.

A magnetic recording apparatus was fabricated, in which a rectangular magnetic recording medium 111 fabricated in Embodiment 8 or Embodiment 9 was combined with a multi-head 112, in which a number of magnetic heads were arranged on one straight line, as indicated in FIG. 20, and magnetic recording/reproduction characteristics thereof were measured.

The multi-head 112 indicated in FIG. 20 effects high speed simple oscillation movement, keeping an spacing of about 0.05 μm from the magnetic recording medium 111 and the magnetic recording medium is so constructed that it can move over an arbitrary distance with a high speed in a direction perpendicular to this simple oscillation movement. The linear density characteristics of the magnetic recording medium measured by means of this instrument were $D_{50}$=75 kFCI for the magnetic recording medium, in which the V film was disposed, and $D_{50}$=68 kFCI for a magnetic recording medium, in which no V film was disposed.

<Embodiment 11>

Figure 21:
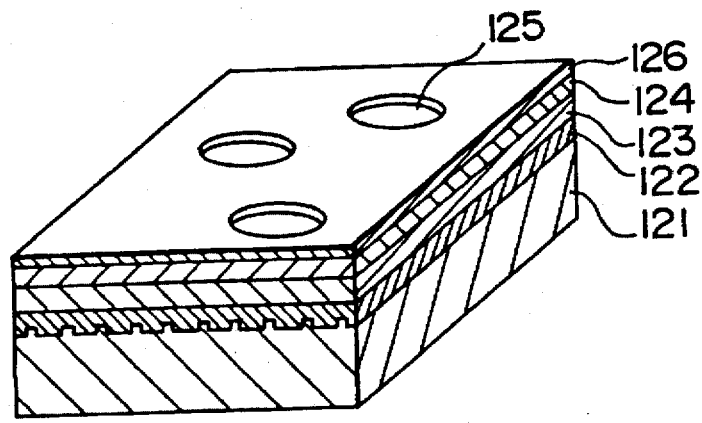
FIG. 21 is a schematical diagram showing a cross-sectional construction of a magnetic recording medium according to Embodiment 11 of the present invention.

A concentric grating having protruding portions 100 nm wide and recess portions 400 nm wide and 50 nm deep with a pitch of 500 nm was formed by the photolithographic method on a surface of a glass substrate having a diameter of 1.8 inches. A magnetic recording medium indicated in FIG. 21 was prepared by a process described below, using this substrate.

An MgO film 122 100 nm thick having the NaCl structure was formed on the substrate 121 kept at a high temperature by the radio frequency sputtering method. After the formation of the film, it was subjected to heat treatment in an electric oven kept in an inert gas atmosphere. The MgO film was examined by the X-ray diffraction method. As the result, it was verified that the MgO film was an oriented polycrystalline film, whose {100} plane was approximately parallel to the substrate. It was confirmed further that the [001] orientation of crystal grains was distributed approximately concentrically. Micro structure of the MgO film was examined by means of a scanning electron microscope and it was verified that it consisted of crystal grains having grain sizes of 100 to 300 nm.

After having polished the surface so as to be flat, a Cr film 123 50 nm thick having a bcc crystallographic structure and a Co—Cr—Pt film 124 15 nm thick having an hcp crystallographic structure were formed thereon by the radio frequency magnetron sputtering method. A Co-21 at % Cr-6 at % Pt target was used for forming the magnetic film. The temperature of the substrate was 400° C. at the formation of the Cr film and 180° C. at the formation of the Co—Cr—Pt magnetic film. The Ar gas pressure at sputtering was 10 mTorr and sputter power was 10 W/cm$^2$.

A recess pattern 125 for magnetic head following was formed on this magnetic recording medium by the photolithographic method. That is, recesses of 1.5 μm×1.5 μm×0.1 μm were formed by the pattern etching method using photoresist in a zigzag shape and then a carbon film 126 10 nm thick was formed as a protective film.

By using the magnetic recording medium according to the present embodiment, since the magnetic recording/reproduction characteristics thereof are improved, it is possible to increase the areal recording density in principle. In addition, since it is possible to realize a high precision tracking by monitoring variations in reflectivity of a light beam emitted by a semiconductor laser device mounted on a part of the magnetic head due to a series of recesses formed on the medium or by utilizing a phenomenon, by which the output of the magnetic head varies when the magnetic head arrives directly above every recess, it is possible to increase significantly the recording density in the track direction and thus to select a combination of the linear density and the density in the track direction in a wide range. As the result, it is possible to effect more easily a high density magnetic recording.

<Embodiment 12>

Figure 10:
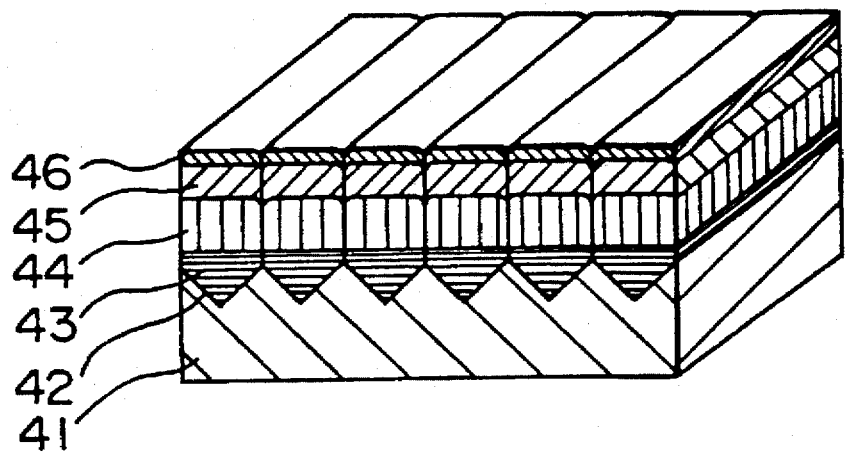
FIG. 10 is a schematical diagram showing cross-sectional construction of a magnetic recording medium according to Embodiment 12 of the present invention.

A concentric grating 42 having a depth of 50 nm and a pitch of 100 nm was formed on a surface of a quartz glass substrate 41 having a diameter of 1.8 inches by means of a diamond tip having a tip angle of 90°. A magnetic recording medium as indicated in FIG. 10 was prepared by a process described below, using this substrate.

An LiF film 43 100 nm thick having an NaCl structure was formed on the substrate 41 kept at a high temperature by the radio frequency sputtering method. After the formation of the film, it was subjected to heat treatment in an electric oven kept in an inert gas atmosphere containing water vapor. The LiF film was examined by the X-ray diffraction method. As the result, it was verified that the LiF film was an oriented polycrystalline film, whose {110} plane was approximately parallel to the substrate. It was confirmed further that [001] orientation of crystal grains were distributed approximately concentrically. Micro structure of the LiF film was examined by means of a scanning electron microscope and it was verified that it consisted of crystal grains having grain sizes of 50 to 100 nm and further that there existed unevenness of 30 to 100 nm on the surface.

After having polished the surface so as to be flat, a Cr film 44 50 nm thick having a bcc crystallographic structure and a Co—Cr—Pt film 45 30 nm thick having an hcp crystallographic structure were formed thereon by the radio frequency magnetron sputtering method. A Co-18 at % Cr-6 at % Pt target was used for forming the magnetic film. The temperature of the substrate was 400° C. at the formation of the Cr film and 180° C. at the formation of the Co—Cr—Pt magnetic film. The Ar gas pressure at sputtering was 3 to 10 mTorr and sputter power was 6 to 10 W/cm². Further a carbon film 10 nm thick was formed as a protective film 46 to fabricate the magnetic recording medium. The structure of the film was examined by the X-ray diffraction and it was confirmed that the Cr film was a <211> oriented polycrystalline film, while the Co—Cr—Ta film was a <1$\bar{1}$00> oriented polycrystalline film.

Magnetic recording media, in which V, Nb, Mo, Cr-5 at % Ti, Cr-2 at % Zr, Cr-20 at % V and Cr-1 at % B were used in lieu of Cr, were fabricated under the conditions identical to those described above. It was verified by the X-ray diffraction method that structures similar to those described previously were realized in both the underlayer having the bcc structure and the magnetic film having the hcp crystallographic structure.

A magnetic recording medium was fabricated as a sample for comparison, in which the Cr film, the Co—Cr—Pt magnetic film and the C protective film were formed under the same conditions as described above directly on a quartz glass substrate on which no grating was formed. As a result of X-ray diffraction it was confirmed that the Cr film exhibited a configuration, in which two sorts of orientation, i.e. <100> and <110>, were mixed, that in the magnetic film there existed mixedly crystal grains, whose easy magnetization axis was parallel to the substrate, and crystal grains, whose easy magnetization axis was inclined by about 30° with respect to the substrate, and that directions of the easy magnetization axis were distributed irregularly in the plane of the substrate.

Evaluation of recording/reproduction characteristics of these magnetic recording media was effected by means of a thin film magnetic head. The magnetic head had a track width of 5 μm and a gap length of 0.2 μm. The distance between the magnetic head and the magnetic recording medium at measurement was 0.06 μm and the relative speed therebetween was 10 m/s. Recording density characteristics, S/N ratio and off-track characteristics were chosen as evaluation items. The recording density characteristics were measured as a half output recording density ($D_{50}$), at which a low frequency reproduced output is decreased to a half; the S/N ratio was measured as a relative value on the basis of an S/N ratio obtained for the sample for comparison; and the off-track characteristics were measured as a relative value of the magnetization spread out beyond the recorded track edge, compared with that obtained for the sample for comparison. Increasing value of the S/N ratio and decreasing value of the off-track characteristics indicate that they are more suitable for high-density magnetic recording.

From TABLE 5 it was verified that the magnetic recording medium according to the present embodiment is improved in all the recording density characteristics, the S/N ratio and the off-track characteristics with respect to the example for comparison and that it has characteristics desirable for a high-density magnetic recording medium.

TABLE 5

| | EXAMPLE FOR COMPARISON | EMBODIMENT 12 | | | | | | | |
|---|---|---|---|---|---|---|---|---|---|
| NaCl STRUCTURE FILM | NONE | <100> ORIENTED LiF FILM | | | | | | | |
| bcc STRUCTURE FILM | Cr | Cr | V | Nb | Mo | Cr—Ti | Cr—Zr | Cr—V | Cr—B |
| RECORDING DENSITY ($D_{50}$ (kFCI)) | 65 | 87 | 85 | 76 | 73 | 95 | 90 | 91 | 90 |

TABLE 5-continued

|  | EXAMPLE FOR COMPARISON | EMBODIMENT 12 | | | | | | | |
|---|---|---|---|---|---|---|---|---|---|
| S/N RATION (RELATIVE VALUE) | 1 | 1.8 | 1.7 | 1.5 | 1.6 | 1.9 | 1.8 | 1.7 | 1.7 |
| OFF-TRACK CHARACTERISTICS (RELATIVE VALUE) | 1 | 0.5 | 0.6 | 0.6 | 0.5 | 0.3 | 0.5 | 0.3 | 0.5 |

Experiments were effected also by using a <110> oriented film made of either one of LiCl, NaCl, KCl, MgO, CaO, TiO, VO, MnO, CoO, NiO, TiC, ZrC, HfC, NbC and TaC in lieu of LiF as a material having the NaCl type crystallographic structure. When a different material is used, the condition for the grapho-epitaxial growth varies. Thus it was necessary to select a film forming method suitable for a certain material or conditions such as substrate temperature at the film formation, heat treatment after the film formation, etc. However it was confirmed that in all the cases where these <110> oriented textured films are used, they have characteristics desirable for a high-density magnetic recording medium, which are similar to those described previously.

<Embodiment 13>

Figure 11:
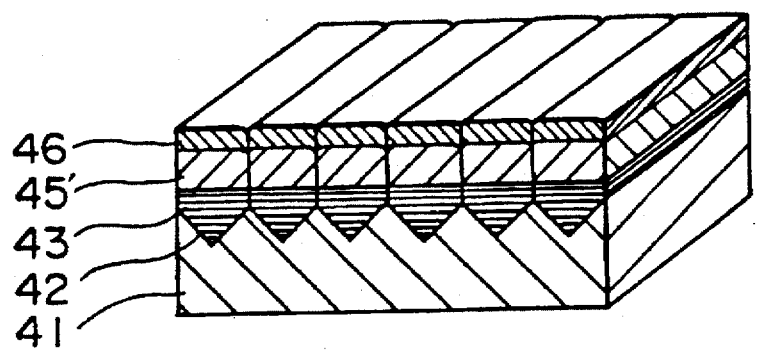
FIG. 11 is a schematical diagram showing cross-sectional construction of a magnetic recording medium according to Embodiment 13 of the present invention.

A <110> oriented film 43 having the NaCl structure, an oriented magnetic film 45' having the hcp structure and a protective film 46 were formed one after another on a surface of a quartz glass substrate 41 having a diameter of 1.8 inches, in which a concentric grating having a depth of 50 nm and a pitch of 100 nm was formed by a process similar to that described previously in Embodiment 12, except that the film formation using the material having the bcc crystallographic structure was omitted, to fabricate a magnetic recording medium having the structure indicated in FIG. 11.

For the magnetic film a binary alloy selected from the group consisting of Co-18 at % Cr, Co-12 at % Ni, Co-18 at % Fe, Co-20 at % V, Co-20 at % Mo, Co-16 at % Ta, Co-20 at % Re, Co-16 at % Pt and Co-15 at % Pd; a ternary alloy selected from the group consisting of Co-18 at % Cr-2 at % Ta, Co-21 at % Cr-3 at % Mo, Co-19 at % Cr-1.5 at % W, Co-15 at % Cr-7 at % Re, Co-14 at % Ni-1 at % Zr, Co-16 at % Pt-2 at % Ta, and Co-18 at % Pt-0.8 at % B; or a quarternary alloy selected from the group consisting of Co-18 at % Cr-2 at % Ta-2 at % B, Co-20 at % Cr-1.5 at % Ta-0.3 at % Si, Co-19 at % Cr-2.5 at % Ta-0.8 at % C, Co-22 at % Cr-1.6 at % Ta-0.2 at % P, Co-21 at % Cr-1 at % Ta-0.2 at % N, Co-12 at % Cr-8 at % Pt-0.7 at % B, was used.

Magnetic recording media were prepared for samples for comparison, in each of which a Cr film 50 nm thick serving as an underlayer was formed on a flat quartz glass substrate, then one of the magnetic films described above was formed thereon, and finally a C protective film was formed further thereon.

Linear densities ($D_{50}$: kFCI) among recording/reproduction characteristics of magnetic recording media obtained by using <110> oriented films of NiO as the material having the NaCl crystallographic structure were as indicated in TABLE 6.

TABLE 6

| MAGNETIC FILM | | EXAMPLE FOR COMPARISON | EMBODIMENT 6 |
|---|---|---|---|
| | NaCl STRUCTURE FILM | NONE | <100> ORIENTED NiO FILM |
| | bcc STRUCTURE FILM | Cr | NONE |
| Co—Cr | | 62 | 81 |
| Co—Ni | | 58 | 78 |
| Co—Fe | | 56 | 75 |
| Co—V | | 60 | 80 |
| co—Mo | | 58 | 74 |
| Co—Ta | | 50 | 80 |
| Co—Re | | 48 | 72 |
| Co—Pt | | 56 | 74 |
| Co—Pd | | 55 | 81 |
| Co—Cr—Ta | | 65 | 85 |
| Co—Cr—Pt | | 64 | 90 |
| Co—Cr—Mo | | 61 | 85 |
| Co—Cr—W | | 58 | 78 |
| Co—Cr—Re | | 62 | 86 |
| Co—Ni—Zr | | 62 | 86 |
| Co—Pt—Ta | | 63 | 90 |
| Co—Pt—B | | 66 | 93 |
| Co—Cr—Ta—B | | 66 | 94 |
| Co—Cr—Ta—Si | | 65 | 90 |
| Co—Cr—Ta—C | | 64 | 86 |
| Co—Cr—Ta—P | | 60 | 80 |
| Co—Cr—Ta—N | | 62 | 83 |
| Co—Cr—Pt—B | | 63 | 90 |

For the S/N ratio and the off-track characteristics other than the linear density, it was verified that characteristics of the magnetic recording media according to the present embodiment were improved by more than 10% with respect to samples for comparison having magnetic films of same compositions formed by using prior art Cr underlayers and that they were therefore excellent as high density magnetic recording media. Also in case where the magnetic films were formed on <110> oriented films having the NaCl crystallographic structure other than NiO, similar improvement effects were recognized.

<Embodiment 14>

Figure 12:
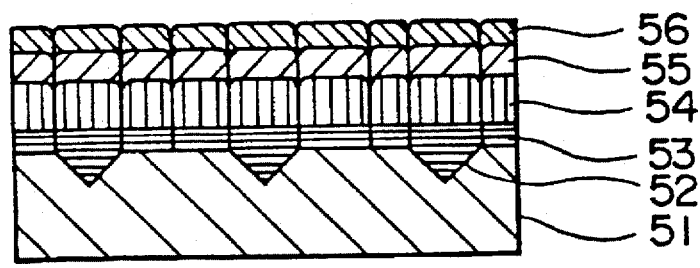
FIG. 12 is a cross-sectional view of a magnetic recording medium according to Embodiment 14 of the present invention.

Grooves 52 having a depth of 20 nm and a pitch of 75 nm was formed concentrically in a surface portion of a quartz glass substrate 51 having a diameter of 1.8 inches by means of a diamond tip having a tip angle of 90°. A magnetic recording medium as indicated in FIG. 12 was prepared by a process described below, using this substrate.

A KCl film 53 50 nm thick having an NaCl structure was formed on the substrate 51 by the radio frequency sputtering method. After the formation of the film, it was subjected to heat treatment in an electric oven kept in a gas atmosphere containing water vapor. The KCl film was examined by the X-ray diffraction method. As the result, it was verified that the KCl film was an oriented polycrystalline film, in which two sorts of planes, {110} and {100}, were approximately parallel to the substrate. By the X-ray diffraction it was verified that a diffraction beam intensity coming from the {110} plane is intense and that the oriented textured plane is {110}. It was confirmed further that crystal grains were distributed approximately concentrically. Micro structure of the KCl film was examined by means of a scanning electron microscope and it was verified that it consisted of crystal grains having grain sizes of 30 to 100 nm and further that there existed unevenness of 20 to 50 nm on the surface.

After having polished the surface so as to be flat, a Cr-2 at % Zr film 54 50 nm thick having a bcc crystallographic structure and a Co—Cr—Ta film 55 20 nm thick having an hcp crystallographic structure were formed thereon by the radio frequency magnetron sputtering method. A Co-18 at % Cr-3 at % Ta target was used for forming the magnetic film. The temperature of the substrate was 300° C. at the formation of the Cr—Zr film and 150° C. at the formation of the Co—Cr—Ta magnetic film. The Ar gas pressure at sputtering was 3 to 10 mTorr and sputter power was 6 to 10 W/cm². Further a carbon film 10 nm thick was formed as a protective film 56 to fabricate the magnetic recording medium. The structure of the film was examined by the X-ray diffraction and it was confirmed that although 200 diffraction was slightly observed for the Cr—Zr film, a diffraction beam intensity due to 211 diffraction was intense and therefore the Cr—Zr film was a <211> oriented textured film, while the Co—Cr—Ta film was a <1$\bar{1}$00> oriented textured polycrystalline film.

<Embodiment 15>

Figure 13:
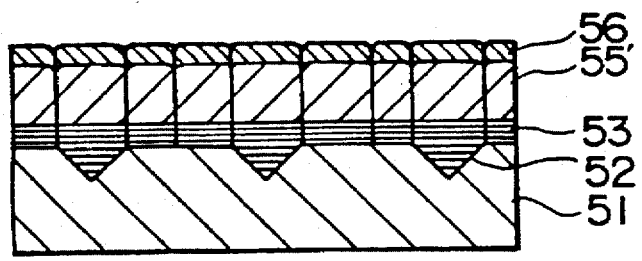
FIG. 13 is a cross-sectional view of a magnetic recording medium according to Embodiment 15 of the present invention.

A Co—Cr—Ta magnetic film 55' was formed directly on a KCl film 53 deposited on a glass substrate 51, on which grooves 52 were formed, by a method similar to that used in Embodiment 14 without forming any Cr—Zr film having the bcc crystallographic structure. A magnetic recording medium having the construction indicated in FIG. 13 was fabricated, in which a C protective film 34 was formed further thereon.

A magnetic recording medium was fabricated as a sample for comparison for Embodiment 14 and Embodiment 15, in which the Cr—Zr film, the Co—Cr—Ta film and the C protective film were formed directly on a flat quartz glass substrate.

Recording/reproduction characteristics were compared under conditions similar to those used in Embodiment 12. As a result it was confirmed that all the magnetic recording media according to Embodiment 14 and Embodiment 15, in which the KCl film exhibiting the <110> dominant orientation was disposed, were better by 20% in the linear density, by 45% in the S/N ratio and by more than 30% in the off-track characteristics than the sample for comparison.

Further, also in case where LiCl, NaCl or LiF was used as another material instead of the KCl film, similar desirable effects were confirmed.

<Embodiment 16>

Figure 14:
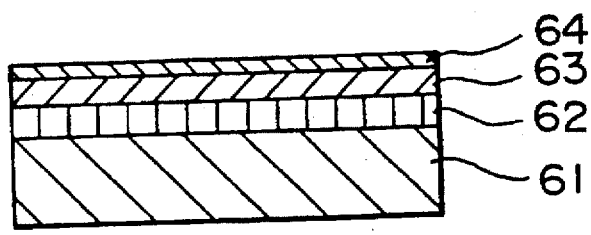
FIG. 14 is a cross-sectional view of a magnetic recording medium according to Embodiment 16 of the present invention.

A magnetic recording medium having a construction indicated in FIG. 14 was fabricated by a process described below, using a rectangular [110] MgO single-crystal substrate, whose one side was 20 mm long, as a substrate 61.

A V film 62 30 nm thick having a bcc crystallographic structure and Co—Cr—Ta—Si film 63 15 nm thick having an hcp crystallographic structure were formed thereon by the radio frequency magnetron sputtering method. A Co-19 at % Cr-2 at % Ta-2 at % Si target was used for forming the magnetic film. The temperature of the substrate was 450° C. at the formation of the V film and 150° C. at the formation of the Co—Cr—Ta—Si magnetic film. The Ar gas pressure at sputtering was 3 mTorr and sputter power was 10 W/cm². Further a boron film 10 nm thick was formed as a protective film 64 to fabricate the magnetic recording medium.

The structure of the film was examined by the X-ray diffraction and it was confirmed that the V film grew epitaxially so that the {211} plane was parallel to the substrate and that the Co—Cr—Ta—Si film grew epitaxially so that the {1$\bar{1}$00} plane was parallel to the substrate. The structure of the magnetic recording medium was examined by means of a transmission electron microscope and it was found that sub-grain boundary existed in the magnetic film and that crystal grains divided by this sub-grain boundary had inclinations comprised between 0.3° to 1°. The average size of the crystal grains was 45 nm. Further the composition of the interior of the crystal grains was also examined and it was found that Cr and Si were segregated in the neighborhood of the sub-grain boundary. Easy magnetization axes of this magnetic recording medium were aligned in one direction, which corresponded to [001] of the [110] MgO substrate.

<Embodiment 17>

Figure 15:
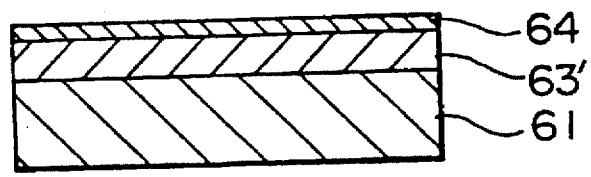
FIG. 15 is a cross-sectional view of a magnetic recording medium according to Embodiment 17 of the present invention.
Figure 16A:
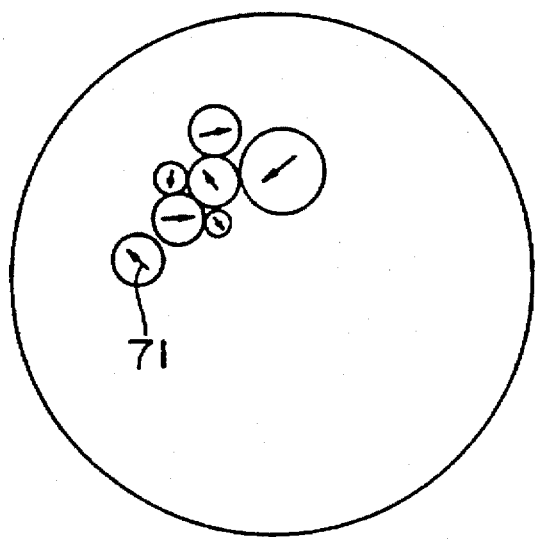
FIGS. 16A and 16B are diagrams indicating directions of easy magnetization axes in a magnetic film.
Figure 16B:
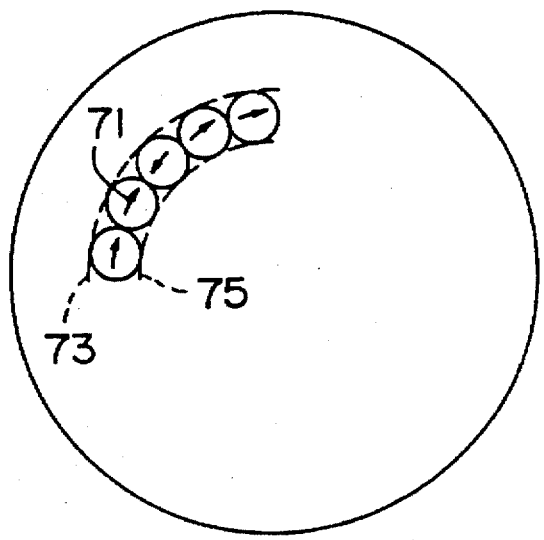

A Co—Cr—Ta—Si magnetic film 63' was formed directly on a [110] MgO substrate 61 by a method similar to that used in Embodiment 16 without forming any V film having the bcc crystallographic structure. A magnetic recording medium having the construction indicated in FIG. 15 was fabricated, in which a C protective film 64 was formed further thereon. Also in this magnetic recording medium the easy magnetization axes were aligned in one direction.

<Embodiment 18>

Figure 22:
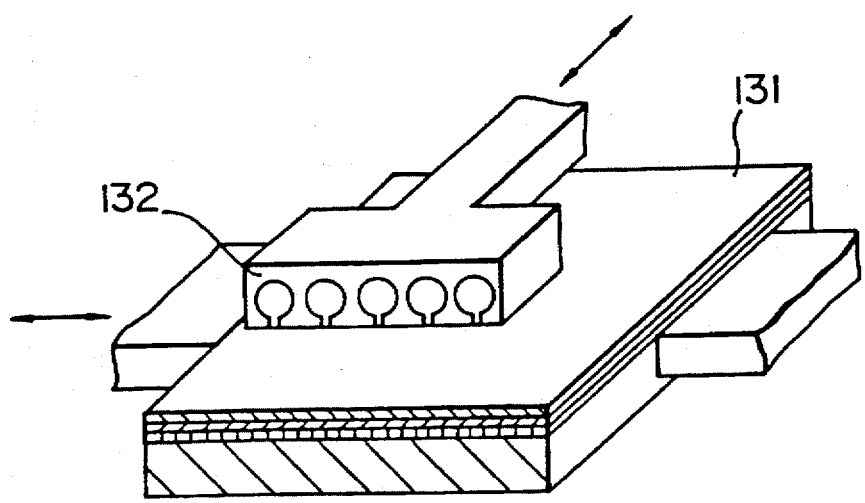
FIG. 22 is a diagram showing the construction of a magnetic recording apparatus according to Embodiment 18 of the present invention.

A magnetic recording apparatus was fabricated, in which a rectangular magnetic recording medium 131 fabricated in Embodiment 16 or Embodiment 17 was combined with a multi-head 132, in which a number of magnetic heads were arranged on one straight line, as indicated in FIG. 22, and magnetic recording/reproduction characteristics thereof were measured.

The multi-head 132 indicated in FIG. 22 effects a high speed simple oscillation movement, keeping a distance of about 0.05 μm from the magnetic recording medium 131 and the magnetic recording medium is so constructed that it can move over an arbitrary distance with a high speed in a direction perpendicular to the simple oscillation movement. Linear density characteristics of the magnetic recording medium measured by this method was $D_{50}$=72 kFCI for a magnetic recording medium, in which a V film was disposed, and $D_{50}$=65 kFCI for a magnetic recording medium, in which no V film was disposed.

<Embodiment 19>

Figure 23:
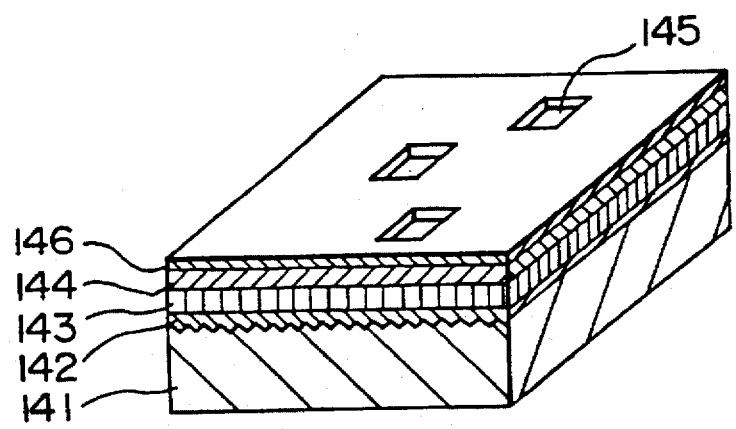
FIG. 23 is a schematical diagram showing a cross-sectional construction of a magnetic recording medium according to Embodiment 19 of the present invention.

A grating having a depth of 50 nm and a pitch of 100 nm was formed concentrically in a surface portion of a quartz glass substrate 141 having a diameter of 1.8 inches by means of a diamond tip having a tip angle of 90°. A magnetic recording medium having a construction indicated in FIG. 23 was prepared by a process described below, using this substrate.

An MgO film 142 100 nm thick having an NaCl structure was formed on the substrate 141 kept at a high temperature by the radio frequency sputtering method. After the formation of the film, it was subjected to heat treatment in an electric oven kept in an inert gas atmosphere. The MgO film was examined by the X-ray diffraction method. As the result, it was verified that the MgO film was an oriented polycrystalline film, in which {110} planes were approximately parallel to the substrate, and further that the [001] direction of crystal grains are distributed approximately concentrically. Micro structure of the MgO film was examined by means of a scanning electron microscope and it was verified that it consisted of crystal grains having grain sizes of 20 to 50 nm.

After having polished the surface so as to be flat, a Cr film 143 50 nm thick having a bcc crystallographic structure and a Co—Cr—Pt film 144 15 nm thick having an hcp crystallographic structure were formed thereon by the radio frequency magnetron sputtering method. A Co-21 at % Cr-6 at % Pt target was used for forming the magnetic film. The temperature of the substrate was 400° C. at the formation of the Cr film and 180° C. at the formation of the Co—Cr—Pt magnetic film. The Ar gas pressure at sputtering was 10 mTorr and sputter power was 10 W/cm². A recess pattern 145 for magnetic head following was formed on this magnetic recording medium by the photolithographic method. That is, recesses of 1.5 µm×1.5 µm×0.1 µm were formed by the pattern etching method using photoresist in a zigzag shape. Then a carbon film 10 nm thick was formed as a protective film 146.

By using the magnetic recording medium according to the present embodiment, since the magnetic recording/reproduction characteristics thereof are improved, it is possible to increase the areal recording density in principle. In addition, since it is possible to realize a high precision tracking by monitoring variations in reflectivity of a light beam emitted by a semiconductor laser device mounted on a part of the magnetic head due to a series of recesses formed on the medium or by utilizing a phenomenon, by which the output of the magnetic head varies when the magnetic head arrives directly above every recess, it is possible to increase significantly the recording density in the track direction and thus to select a combination of the. linear density and the density in the track direction in a wide range. As the result, it is possible to effect more easily a high density magnetic recording.

What is claimed is:

1. A method for fabricating a magnetic recording medium comprising a step of forming, on a substrate, a <100> oriented film made of a material having a NaCl crystallographic structure by a physical vapor deposition method so that it has a thickness greater than 10 nm and smaller than 100 µm; a step of forming a film made of a material having a body centered cubic crystallographic structure further thereon by a physical vapor deposition method so that it has a thickness smaller than 1 µm; and a step of forming a magnetic film made of a Co based alloy having a hexagonal close packed structure still further thereon by a physical vapor deposition method so that it has a thickness greater than 2 nm and smaller than 100 nm.

2. A method for fabricating a magnetic recording medium according to claim 1, wherein Cr, V, Nb, Mo or an alloy, whose main component is these elements, is used for the material having the body centered cubic structure.

3. A method for fabricating a magnetic recording medium according to claim 1, wherein either one of MgO, CaO, TiO, VO, MnO, CoO and NiO or a mixed crystal, whose main component is these compounds, or either one of LiCl, NaCl and KCl or a mixed crystal, whose main component is these compounds, or LiF, or either one of TiC, ZrC, HfC, NbC and TaC or a mixed crystal, whose main component is these compounds, is used for the material having the NaCl type crystallographic structure.

4. A method for fabricating a magnetic recording medium according to claim 1, wherein a Co based alloy having a hexagonal close packed structure containing at least one selected from the element group consisting of Cr, Ni, Fe, V, Ti, Zr, Hf, Mo, W, Ta, Re, Ru, Rh, Ir, Pt, Pd, Au, Ag, Cu, B, Al, C, Si, P and N is used for the magnetic film.

5. A method for fabricating a magnetic recording medium according to claim 1, wherein a sputtering method is used for the physical vapor deposition method.

6. A method for fabricating a magnetic recording medium according to claim 1, further comprising a step of forming a recess-shaped pattern for tracking on a part of the magnetic film.

* * * * *